US012067047B2

(12) United States Patent
Thierry et al.

(10) Patent No.: US 12,067,047 B2
(45) Date of Patent: Aug. 20, 2024

(54) METHODS AND APPARATUS FOR DETECTING DUPLICATE OR SIMILAR IMAGES AND/OR IMAGE PORTIONS AND GROUPING IMAGES BASED ON IMAGE SIMILARITY

(71) Applicant: Wrethink, Inc., Del Mar, CA (US)

(72) Inventors: Christian Thierry, Tijuana (MX); James Gardner, Palm Springs, CA (US)

(73) Assignee: Wrethink, Inc., Del Mar, CA (US)

( * ) Notice: Subject to any disclaimer, the term of this patent is extended or adjusted under 35 U.S.C. 154(b) by 7 days.

(21) Appl. No.: 17/588,927

(22) Filed: Jan. 31, 2022

(65) Prior Publication Data

US 2022/0245189 A1    Aug. 4, 2022

Related U.S. Application Data

(60) Provisional application No. 63/143,951, filed on Jan. 31, 2021.

(51) Int. Cl.
| | |
|---|---|
| G06F 16/51 | (2019.01) |
| G06F 16/55 | (2019.01) |
| G06T 1/60 | (2006.01) |
| G06T 3/4084 | (2024.01) |
| G06T 7/11 | (2017.01) |
| G06V 10/762 | (2022.01) |

(52) U.S. Cl.
CPC .............. *G06F 16/55* (2019.01); *G06F 16/51* (2019.01); *G06T 1/60* (2013.01); *G06T 3/4084* (2013.01); *G06T 7/11* (2017.01); *G06V 10/7625* (2022.01); *G06T 2207/20021* (2013.01)

(58) Field of Classification Search
CPC ........ G06F 16/55; G06F 16/51; G06F 16/583; G06T 1/60; G06T 3/4084; G06T 7/11; G06T 2207/20021; G06V 10/7625
USPC .......................................................... 707/740
See application file for complete search history.

(56) References Cited

U.S. PATENT DOCUMENTS

| | | | |
|---|---|---|---|
| 8,958,661 B2 * | 2/2015 | Panda ................... | G06F 16/532 |
| | | | 707/915 |
| 11,202,085 B1 * | 12/2021 | Holcomb ............. | H04N 19/105 |

(Continued)

*Primary Examiner* — Hicham Skhoun
(74) *Attorney, Agent, or Firm* — Straub & Straub; Michael P. Straub; Stephen T. Straub

(57) ABSTRACT

A multi-purpose appliance for archiving and distributing electronic copies of images is described. Methods and apparatus of the present invention relate to detecting duplicate images and/or similar image portions, grouping images and/or organizing images that are being stored and for searching stored images are described. Received images are segmented into portions and perceptual hash values are generated for each of the image portions. Information relating to image portions and an original input image are stored along with the original input image and generated image portions. The hash values of multiple images are compared and similar images are automatically grouped together into clusters. Images are identified for retrieval purposes using their hash values and/or the hash values of one or more images in a cluster in which an image is stored. An image or image portions is sometimes supplied as part of a search to retrieve similar or related images.

20 Claims, 15 Drawing Sheets

(56) References Cited

U.S. PATENT DOCUMENTS

| | | | |
|---|---|---|---|
| 2015/0339829 A1* | 11/2015 | Smarda | H04N 19/126 |
| | | | 382/250 |
| 2019/0311744 A1* | 10/2019 | Shenkler | G11B 27/10 |
| 2019/0377971 A1* | 12/2019 | Song | G06V 10/761 |
| 2020/0311898 A1* | 10/2020 | Hawke | G06T 7/001 |
| 2021/0248446 A1* | 8/2021 | Hughes | G06V 10/764 |
| 2021/0327070 A1* | 10/2021 | Wang | G06T 7/11 |

* cited by examiner

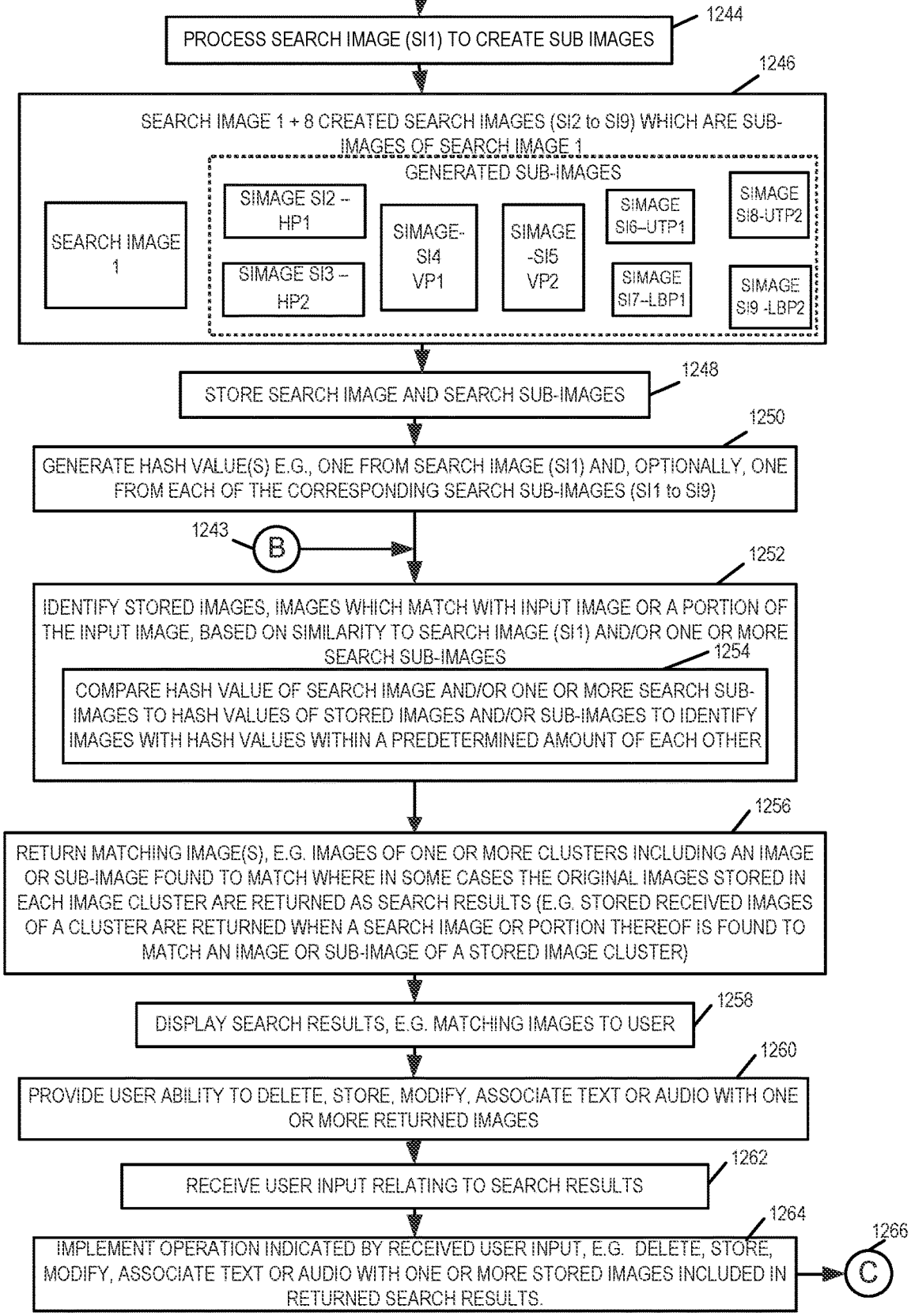

METHODS AND APPARATUS FOR DETECTING DUPLICATE OR SIMILAR IMAGES AND/OR IMAGE PORTIONS AND GROUPING IMAGES BASED ON IMAGE SIMILARITY

RELATED APPLICATIONS

The present application claims the benefit of U.S. Provisional Patent Application Ser. No. 63/143,951 which was filed on Jan. 31, 2021 and which is hereby expressly incorporated by reference in its entirety.

FIELD OF THE INVENTION

The invention relates to detecting duplicate images and/or similar image portions, grouping images and/or organizing images that are being stored, e.g., to facilitate and/or support image retrieval.

BACKGROUND

Perceptual hashing of an image involves the use of a hash function that produces a value based on image content. A perceptual hash function applied to different images will produce similar hash values from the different images when the image content is similar. Thus, perceptual hash functions produce similar hash values if the features of an image are analogous. This is very different from cryptographic hashing which often relies on what is known as an avalanche effect where a small change in an input value to the cryptographic hash function creates a drastic change in output value.

Image hashes are sometimes used to determine if two images are identical or look nearly identical. This is different from cryptographic hashing algorithms (like MDS, SHA-1) where tiny changes in the image give completely different hashes.

Various perceptual image hash functions exist. Some image hash algorithms are based on generating a hash value by hashing DCT (Discrete cosine transform) values used to represent an image and can be used to analyze the image structure allowing hashes of different images of the same size and shape to be compared and used to determine if two images are in fact different copies of the same image.

With modern photo editing software, images are often cropped, resized, or filtered. Alternatively portions of one image can be combined with all or a portion of another image.

For image storage and retrieval purposes it would not only be desirable to be able to detect duplicate images where two versions of the same image are being evaluated for storage but also to determine which images include portions which are the same or similar to other images to facilitate image storage and/or grouping of related non-identical images. It is also desirable to be able to detect images which have portions which are the same or similar in terms of content but a portion of the images, e.g., a large portion or even the majority of the images, may be different. The detection of images which include the same or similar content and/or the arrangement or grouping of images for storage is a technical problem.

SUMMARY OF THE INVENTION

Methods and apparatus of the present invention relate to detecting duplicate images and/or similar image portions, grouping images and/or organizing images that are being stored, e.g., to facilitate and/or support image retrieval.

In various embodiments one or more images are received. Received images are segmented into portions and perceptual hash values are generated for each of the image portions. Information relating to image portions and an original input image are stored along with the original input image and generated image portions.

The hash values of multiple images are compared, e.g., using AI techniques, and similar images are automatically grouped together into one or more clusters. Clusters can be and sometimes are arranged into a hierarchy.

Duplicate images can be and sometimes are identified based on the corresponding hash values and duplicate images need not be stored. Related images can and often are grouped together.

During an image retrieval operation, a user can provide an image or portion of an image as part of a retrieval request. Alternatively, the user can identify a stored image and request similar or related images. Similar images and/or related images, e.g., images generated from a common source image, can be and sometimes are identified based on the similarity between a hash value generated from the input image provided as part of a retrieval request or an identified image which was specified in the retrieval request. Images having similar hash values to the provided or specified image are identified and retrieved. In some embodiments groups of images which were grouped into a cluster or corresponding to a cluster level including an image having a hash value similar to that of the input or identified image are retrieved in response to an image retrieval request.

In addition to automatic detection of duplicate images which are to be stored, and the deleting of duplicate images, the methods and apparatus of the invention include features which can be used to support automatic grouping, e.g., clustering, of images as well as searching of images. Searching can be performed based on a search input which includes a search image, e.g., a captured image or a portion of a captured image. Alternatively, a hash value can be provided as part of the search image. The methods and apparatus support automatic grouping of images into clusters Various additional features and advantages of the present invention are discussed in the detailed description which follows.

BRIEF DESCRIPTION OF THE DRAWINGS

FIG. 12B shows the steps of a second part of the exemplary method the first part of which is shown in FIG. 12A.

DETAILED DESCRIPTION

Figure 1:
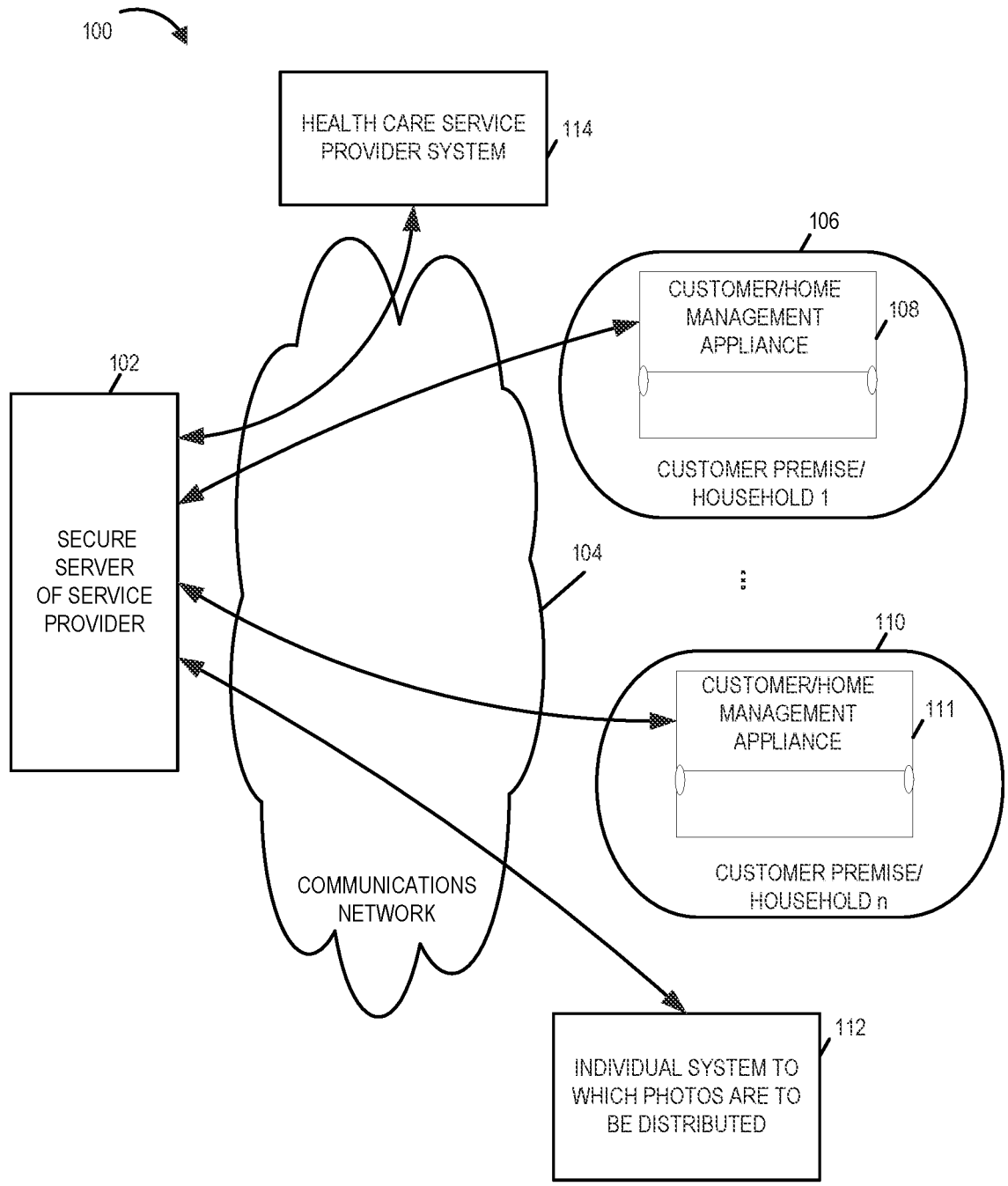
FIG. 1 illustrates an exemplary communications system in which a home appliance and secure server of the present invention may be used.

FIG. 1 illustrates an exemplary system 100 in which one or more appliances, e.g., a home appliances 108, 111 of the invention may be used to input data which can be added to a digital data store. The system 100 includes a secure server 102 of provider of a service, e.g., a home information and/or communications management service, a health care service provider system 114, an individual system 112 to which photos and/or other data is to be distributed and a plurality of customer premise locations 106, 110, e.g., household locations, each of which includes a home appliance 106, 111 implemented in accordance with the present invention. Various elements of the system 100 are coupled together via a communications network 104 which may be the Internet, a public telephone network, or a combination of one or more networks. While the communications network may be a public network, communications links over the network may, and in various embodiments are, secured using encryption and/or other techniques. The communications links between the home appliances 108, 110 may be Virtual Private Network (VPN) communications links. Access to other systems, e.g., the health care service provider system, Internet search provider systems, E-mail systems, etc via the home appliance may be protected by a firewall included in or managed by the service provider's secure server 102. The secure server 102 supports various functions and can interact with the home appliances 108, 111 of the present invention to provide a wide variety of services, information management functions, device information synchronization functions, communication service management functions, etc. in a secure manner. The services/functions supported by the secure server 102 include one or more of the following: i) media (e.g., image/film/document) archiving, documenting and distribution functions, ii) video phone service; iii) conferencing and on-line collaboration functions, e.g., allowing for simultaneous document viewing of documents or images by users each of which has an appliance of the present invention; and iv) monitoring functions such as health monitoring functions; v) communications service management functions, vi) device data synchronization functions; and vii) household bulletin board functions, etc.

Figure 2:
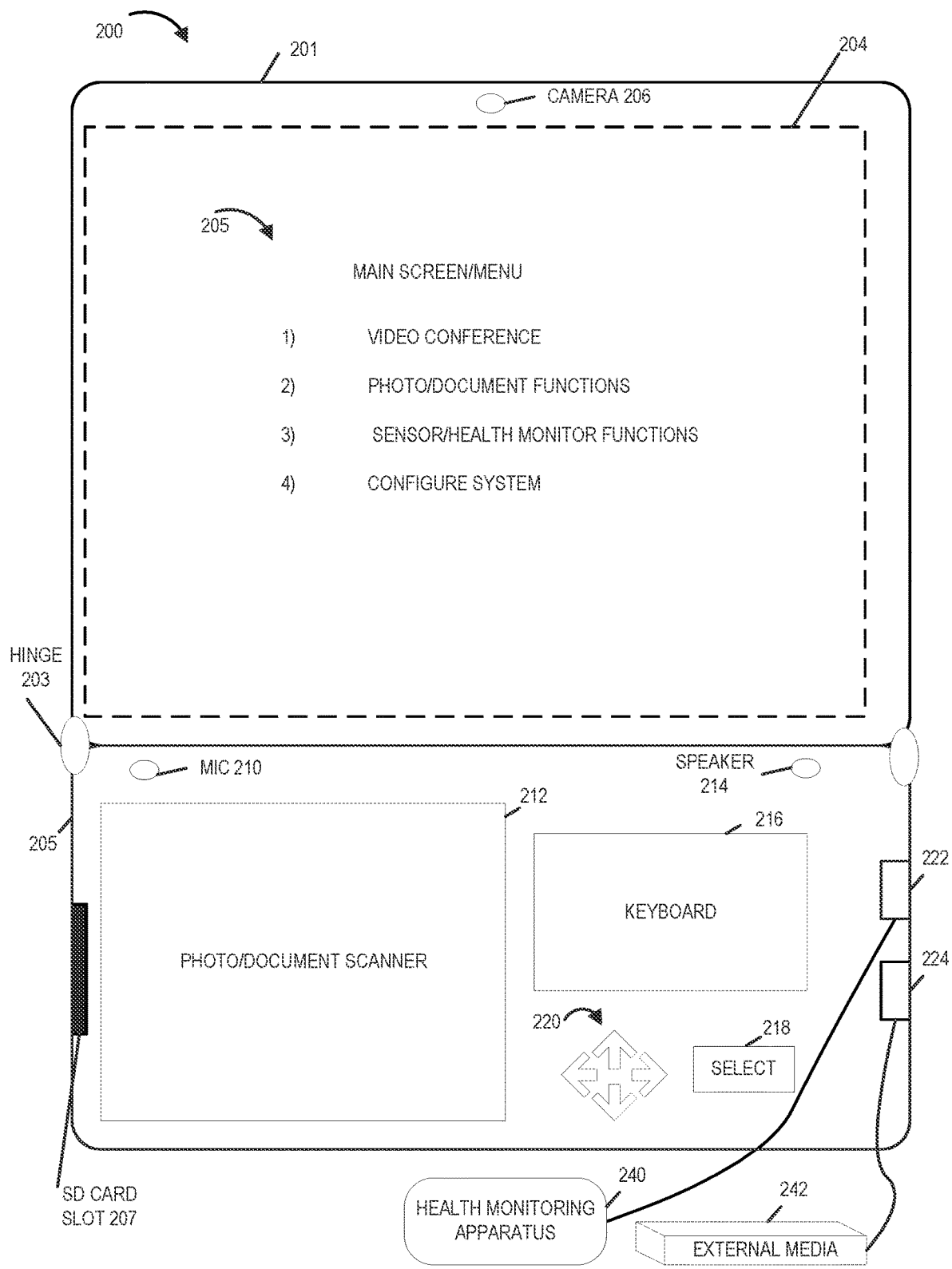
FIG. 2 illustrates an exemplary customer/home management appliance implemented in accordance with the invention which may be used in the system of FIG. 1.

FIG. 2 illustrates an exemplary tabletop appliance 200 implemented in accordance with the invention. The household appliance 200 includes a housing (201, 205 in combination) which is formed by an upper housing portion 201 and a lower housing portion 205 coupled together by a hinge 203. Mounted to the housing, and thus integral therewith, is a camera 206, display screen 204, a memory card slot 207, e.g., a secure digital (SD) memory card slot, photo/document scanner 212, microphone 210, speaker 214, optional keyboard 216, arrow keys 220, select key 218 and various interfaces 222, 224. The display screen 204 may be, and in some embodiments is, a color touch screen. In various touch screen embodiments, keyboard 216 may be omitted. The interfaces 222, 224 may be wired interfaces, wireless interfaces and/or a combination of wired and wireless interfaces. In the case of wireless interfaces, the interface 222 or 224 may include both receiver and transmitter circuitry for receiving and transmitting signals. Internal to the appliance 200, and thus not visible in the FIG. 2 illustration, is a processor and memory. The processor controls operation of the device under direction of one or more modules, e.g., routines, stored in memory. The memory may also be used to store document images, photo images, etc. However, in order to keep implementation costs low, in some embodiments the apparatus 200 includes a relatively small amount of memory with the appliance relying on network connectivity and network storage for data intensive functions such as storing large photo albums and/or large numbers of documents. Additional storage can be added to the apparatus by inserting a memory card, e.g., SD, XD or other type of memory card, in card slot 207 or by attaching an external media device 242, e.g., a USB hard disc drive, to one of the I/O interfaces 222 or 224. The tabletop appliance 200 can, and sometimes does, perform optical character recognition and then perform various asset ownership and/or asset management/access control functions based on the scanned or user provided input. In other embodiments the device 200 communicates scanned documents and/or user input.

Various peripheral devices, e.g., a health monitoring apparatus 240, may be added to, e.g., coupled to, the appliance 200, to supplement the stand alone appliance's capabilities. Various peripheral devices used in some embodiments include one or more of the following: a media reader such as one or more of the following: a slide reader, a cassette recorder reader (audio or video), a floppy disk reader, a 78 record playback drive, a reel to real tape reader, a film reader. The various readers digitize analog input which is then processed and stored in digital form, e.g., in one or more files and/or communicated via a communications network, e.g., to a network server for storage and/or distribution.

In some embodiments, where healthcare is supported, the appliance 200 is coupled to a monitoring apparatus for monitoring one or more sensor inputs. The sensor inputs may include one or more human health monitors, motion monitors and/or a variety of environmental condition monitors such as security sensors, temperature sensors, etc. A blood pressure monitor, glucose level monitor, heart rate monitor, and blood oxygen level monitor are among the various sensors and monitors which are used and supported in some embodiments. In some embodiments interface 222 is coupled to a sensor network from which the appliance 200 receives signals used to detect at least one of movement and proximity of a living being.

In some embodiments the appliance is configured to generate an alarm and automatically initiate an audio/video conference in the event motion is not detected at predetermined intervals or during a monitoring period determined according to a programmed schedule. For example, the device may be set to detect motion in the morning and, failing to detect the motion may set off an alarm based on the concern that the resident may have been unable to get up or make to the room in which the appliance is located to take medication at a scheduled time. The device may be set to monitor for audio alarms, e.g., a person yelling for help, or for an alarm signal which may be transmitted to the device 200 by an item worn on an individual expected to use the appliance. In the event of an alarm condition, the appliance may initiate a video conference call in which audio as well as video may be monitored and an individual at the customer premise at which the appliance is located may communicate with an individual at another location, e.g., monitoring location, without having to get up or move, through the automatic use of the microphone (mic) 210 and speaker 214.

In the FIG. 2 example, display 204 illustrates an exemplary opening menu 205. The appliance 200 may be pre-configured to display the opening menu upon power up. The menu 205 lists various selection options including a first option corresponding to a video conference function, a second option corresponding to various photo and/or document functions, a third option relating to sensor and/or health monitoring functions and a fourth option relating to system configuration. Each of the functions may be highlighted by moving around on the screen using arrow keys 220 and by pressing select key 218 to indicate a user selection. Alternatively, in touch screen embodiments, a user of the appliance may select an option by touching the portion of the display screen 204 on which the desired option is displayed.

Upon selection of the video conference option a user is presented with an additional screen that allows a user to initiate or join a video conference, e.g., by entering an identifier corresponding to a party or parties which are to be contacted or by accepting a received invitation to join a video conference initiated by another party, e.g., an individual using another appliance 200 of the present invention.

Upon selection of the photo/document functions option a user is present with a menu that allows the user to maker further selections relating to the scanning of photos or documents including the optional recording of voice commentary and an image of the individual providing the commentary, e.g., as part of creating an electronic collection of photos or documents, e.g., an album, which can be uploaded to a server, stored on the server and/or distributed by the server. Given the limited memory on the system 200, in some embodiments individual images and documents, along with any commentary or image of the person providing the commentary, are uploaded to a server via a network interface with the server then storing the multiple images and compiling them into albums in accordance with input received from the appliance 200.

Upon selection of sensor/health monitor functions, the user is provided with additional options and supported actions relating to the sensors and/or health monitoring peripheral device 240 coupled to the appliance 200. The appliance 200 supports automatic detection and configuration of peripheral devices. Accordingly, as a user adds or removes peripheral devices the options available upon selection of the sensor/health monitoring functions option will change depending on the sensors/health monitoring apparatus present at a particular point in time.

Upon selection of the configure system option, a user is provided with various configuration options, e.g., display and other setting options. A user may provide a security key, e.g., a Wired Equivalent Privacy (WEP) key, required to obtain wireless connectivity to a local network via setting entry options presented after the configure system option is selected. While a user may configure the appliance 200 manually, the device can also be configured remotely, e.g., by a server in the network to which the apparatus 200 is connected. A telephone interface and pre-programmed telephone number may be included in the apparatus 200 for obtaining configuration information via the public telephone network. However, where wireless or other Internet connectivity is supported, the appliance may connect via such a connection to a network based server to obtain additional or updated configuration information or to download new application software, e.g., relating to one or more peripheral devices which may be added to the apparatus 200.

Figure 3:
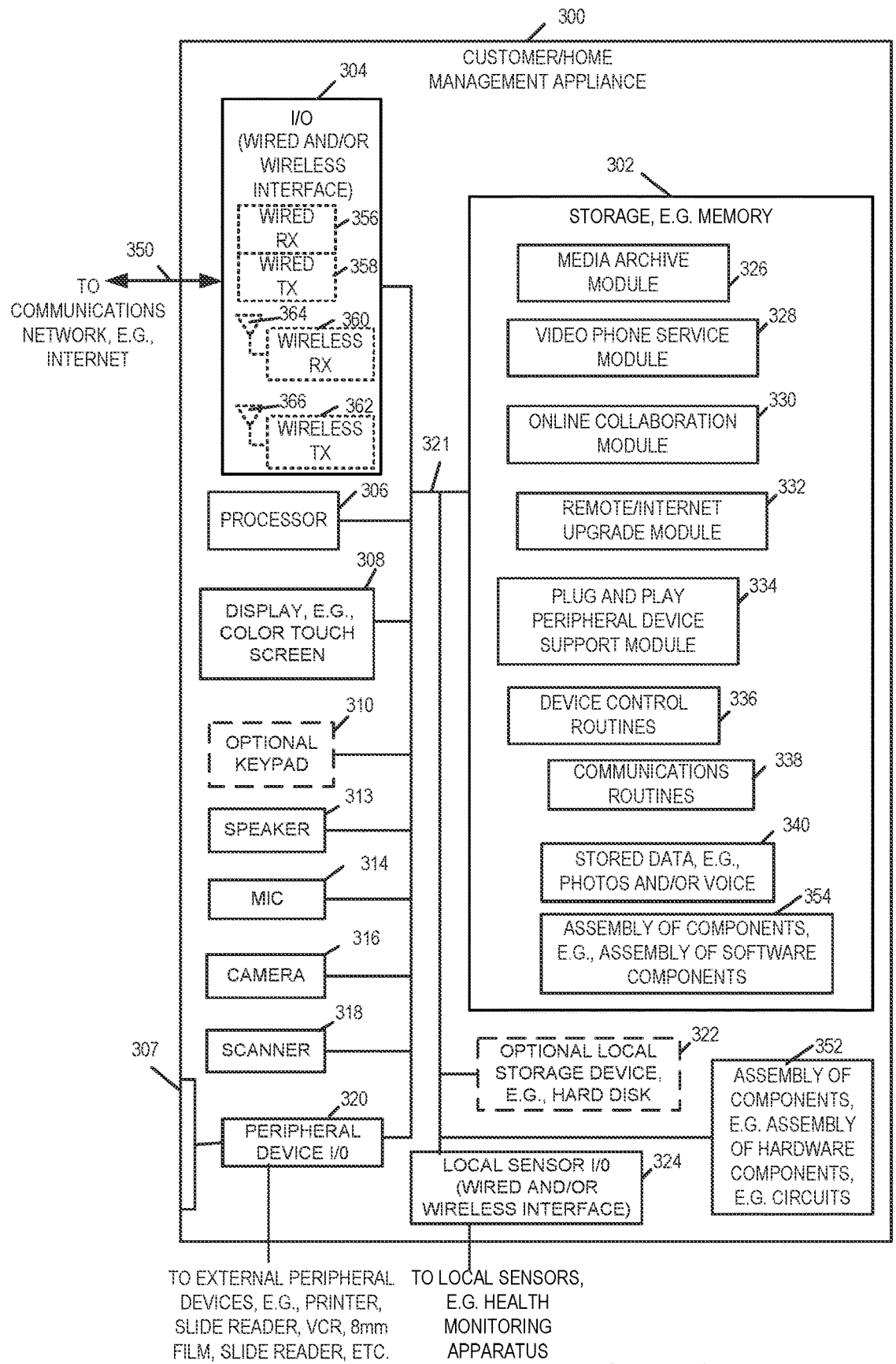
FIG. 3 is a more detailed illustration of the exemplary customer/home management appliance shown in FIG. 2

FIG. 3 illustrates, in block diagram form, a customer appliance 300 implemented in accordance with one exemplary embodiment of the present invention. The appliance 200 may include the same elements as the appliance 300 shown in FIG. 3. The appliance 300 includes an input/output interface 304, processor 306, assembly of components 352, e.g., assembly of hardware components, e.g., circuits, display 308, optional keypad 310, speaker 313, microphone 314, camera 316, scanner 318, peripheral device I/O 320, memory 302, optional local storage device 322 and a local sensor I/O 324 coupled together by a bus 321 which allow the various components to exchange data and other signals. The various components are securely, e.g., permanently, mounted to a housing and thus are integral to the appliance 300. The housing may be a single fixed assembly or a multi-part housing such as the multipart housing including upper and lower parts 201, 205 shown in the FIG. 2 example.

The I/O module 304 severs as a network interface and coupled the appliance 300 to a communications network, e.g., the Internet and/or public telephone network as indicated by communications link 350. The I/O may be implemented as a wired and/or wireless interface. In some embodiments, I/O interface 304 includes wired receiver (RX) 356 and wired transmitter (TX) 358. In some embodiments, I/O interface 304 includes wireless receiver (RX) 360 coupled to receive antenna 364 and wireless transmitter (TX) 362 coupled to transmit antenna 366. In one embodiment the I/O 304 includes an Ethernet port for connection to wired networks, a telephone jack for connection to standard telephone networks and also a wireless interface, e.g., a WiFi interface for connecting to a wireless network. Other types of network interfaces can be supported such a conventional cell phone interfaces thereby allowing the customer appliance to communicate with other devices and network servers using any one of a wide variety of communications networks.

Processor 306 controls operation of the customer appliance in accordance with one or more control routines stored in memory 302. The processor 306 controls, among other things, the presentation of menus and prompts on display 308 and the disposition of scanned images and/or other files in accordance with user input, e.g., menu selections and destination information, which may be entered by a user of the customer appliance 300. The display screen 308 is used for displaying menus, scanned images, and other information. In some embodiments the display screen 308 is implemented as a color touch screen. In touch screen embodiments the keypad 310 may be omitted. Accordingly, the keypad 310 is shown as an optional element. In order to provide audio output, e.g., to allow for the playback of recorded commentary and/or to support audio output as part of a video conference call, the appliance 300 includes speaker 313. To support capture of audio, e.g., to allow for recording of picture commentary and/or the input of voice as part of a video conference call, the appliance 300 includes mic 314.

Camera 316 is provided for capturing still images and/or video of the user of the appliance 300. In the case of commentary provided relating to a scanned photo, the camera can, and in some embodiments is, used to capture an image or video of the person providing the commentary. The camera 316 also supports video capture enabling video conference calls from the appliance 300. The camera 300 is usually mounted at a location on the appliance housing from which the image of a user of the appliance can be easily captured. In some embodiments, the camera 316 is mounted above the display screen 308 as shown in FIG. 2.

Scanner 318 allows photos to be scanned. Scanned images may, and in some embodiments are, automatically reoriented prior to display thus allowing an image to be scanned in any direction with the appliance re-orienting the image after scanning. In some embodiments scanner 318 is implemented as a small flatbed scanner capable of scanning 3×5 images. Such a size is well suited for standard photos. Larger scanning bed sizes may also be used. In other embodiments the scanner is implemented as a device having a slot or feed input and the item to be scanned is moved over a scanning area. Accordingly, depending on the particular embodiment, the scanner 318 may be implemented in different formats. The scanner 318 can be used as a document scanner allowing documents to be scanned and displayed as part of a video phone conference.

The peripheral device input/output interface 320 serves to interface the device 300 with a variety of external optional peripheral devices as well as a memory card slot 307. The memory card slot 307 allows for memory cards often used for the storage of photos to be read and/or written. Thus, not only can the appliance 300 be used to document and archive physical photos which can be scanned, but can also be used to add commentary to images which were captured by a modern digital camera. Thus, the appliance 300 remains relevant and useful even as a user may migrate from film and photos to electronic cameras and electronic photos.

Among the peripheral devices which are supported by the interface 320 are various optional peripheral devices such as a printer, slide reader, VCR, 8 mm film reader, slide reader, etc. These peripheral devices may be purchased by a user at the time of purchase of the appliance or later, e.g., on an as needed basis. Peripheral devices added to the customer appliance 300 are automatically detected, configured if necessary and the added functionality and menu options made possible by the addition of the peripheral device are automatically added by the appliance 300 to its set of menus. The peripheral device I/O interface 320 may support USB devices. In addition to the interface 320, a sensor interface 324 is provided for receiving local sensor input. The sensor interface 324 may include a wired and/or wireless receiver/transmitter. A large variety of sensors may interface with the appliance 300 via the local sensor I/O interface 324. Sensors which may be coupled to the appliance 300 via interface 324 include, e.g., health monitoring sensors, motion sensors, alarm sensors, etc. As discussed above, peripheral devices in the form of medical sensors may be paid for and coupled to the appliance 300 at any time. Thus, a user of the system 300 may purchase the system for, e.g., photo and video conferencing functions, and an insurance company may purchase and provide the user a health monitoring device at some later time to be used with the appliance 300, e.g., at the insurer's expense. Health monitoring devices may include blood sugar level monitors, blood pressure monitors, heart rate monitors, etc which may be coupled to the device 300 via interface 324. Information provided by sensors via interface 324 can, and in various embodiments are, uploaded by the appliance 300 to a network server for forwarding to a health care provider, e.g., a doctor or health insurance provider. Thus, the appliance 300 can be used to support health monitoring functions in addition to supporting video conferencing and photo achieving.

Appliance 300 can be, and in some embodiments is, configured to detect various alarm conditions and take action in response to an alarm condition. For example, in response to the failure to detect expected motion, or in response to detecting sudden motion indicative of a fall, the appliance 300 may initiate an audio or video conference with a monitoring service or healthcare provider which can then assess the situation and make an informed decision as to whether or not to send, e.g., dispatch, medical help. Smoke and/or heat sensors may be used to trigger a fire alarm which, like a medical alarm, may trigger a video conference call which can result in emergency service personal being dispatched, e.g., fire fighters and/or police may be dispatched to the customer premise.

For cost reasons the memory 302 may be relatively small. The memory 302 may be non-volatile and can be used to store various modules, e.g., routines, which support various device functions. In addition, memory 302 may have the capacity to store a limited number of photos and corresponding audio/video commentary which can then be uploaded to a network storage device via network interface 302.

In the FIG. 3 embodiment, memory includes a media archive module 326, a video conference call module 328, an online collaboration module 330, remote/Internet upgrade module 332, a plug and play peripheral device support module 334, device control routines 336, communications routines 338 and stored data 340, e.g., photos and/or audio/video commentary.

While memory 302 may be somewhat limited in size for cost reasons, in some embodiments an optional local storage device 322, e.g., a hard disk, is included to provide for ample storage for digital images, video and audio on the appliance 300. Cloud or network storage is also supported making optional local storage device 322, e.g., the hard disk, less important in cases where reliable network connectivity is available.

Media archive module 326 controls the scanning, documentation (audio and/or video documentation) of images such as photos and physical documents. As discussed above, photos can be scanned, stored in digital form with captured audio and/or video commentary and distributed, e.g., via the I/O interface 304, e.g., a network interface, under control of media archive module 326. Video conference module 328 is responsible for handling video conference call establishment and video conference call maintenance. On-line collaboration module 330 allows users to establish on-line collaboration sessions which may involve use of the video conference capabilities available from module 328 as well as document exchange capabilities made possible by the availability of the scanner 318. Remote/Internet upgrade module 332 allows for the appliance 300 to exchange data and/or control information with a remote server via a communications network such as the Internet or a public telephone network. Remote upgrade module 332 makes it possible for the routines in memory 302 to be updated, added to or replaced via a remote network server. Thus, new applications and routines may be retrieved and installed automatically, e.g., as new peripheral devices are detected. Plug and play peripheral device support module 334 is responsible for detecting new peripheral devices, retrieving corresponding applications or routines from the network if required, automatically install the retrieved routines and for taking any other action required to automatically support various peripheral devices attached to the customer appliance 300. The plug and play support made possible by module 334 allows a user to add supported peripheral devices without have to be concerned with having to manually configure the appliance 300 to support the peripheral device.

Device control routines 336 include a variety of routines, including alarm generation and detection routines, data storage control routines, etc. that support or control the device to operate in accordance with the methods of the present invention.

Communications routines 338 support voice and data communications and enable communications sessions to be established via the appliance 300. Stored data 340 includes stored photos, voice and/or image data corresponding to commentary relating to scanned or input photos or documents. The stored data 340 may also include menu information and/or other system configuration information. The system configuration information may be preloaded and/or automatically updated as peripheral devices as added and/or the device is reconfigured to support new applications. Updating of configuration information stored in memory 302 may be done automatically by a remote server coupled to the customer appliance 300 via a communications network. Data 340 may include alarm settings which determine when a video conference call is to be initiated, e.g., in response to a fall sensor, heat sensor, smoke alarm or another monitoring device which may supply signals to the customer appliance 300. Storage 302, e.g., memory, further includes an assembly of components, e.g., assembly of software components, e.g., software routines and/or software modules.

In view of the above discussion, it should be appreciated that the appliance of the present invention is easy to set up, simple to use, supports a wide variety of applications and can be updated remotely and/or through the addition of add on peripheral devices which can increase the number of supported functions. The appliance of the present invention supports enough functions that it can appeal to a wide range of family members and/or age groups. Since purchase of the appliance can be justified by the many non-health related functions it supports, purchase of the appliance can be motivated without using the health monitoring features as a primary reason to purchase the appliance. Health care providers can cover the cost or supply health monitoring related peripheral devices and can take advantage of the remote reporting and alarm features supported by the appliance thereby potentially reducing the cost of health care services without saddling health insurance companies with the cost of the communications interface and/or network related costs that might be associated with having to provide a complete monitoring system.

Figure 4:
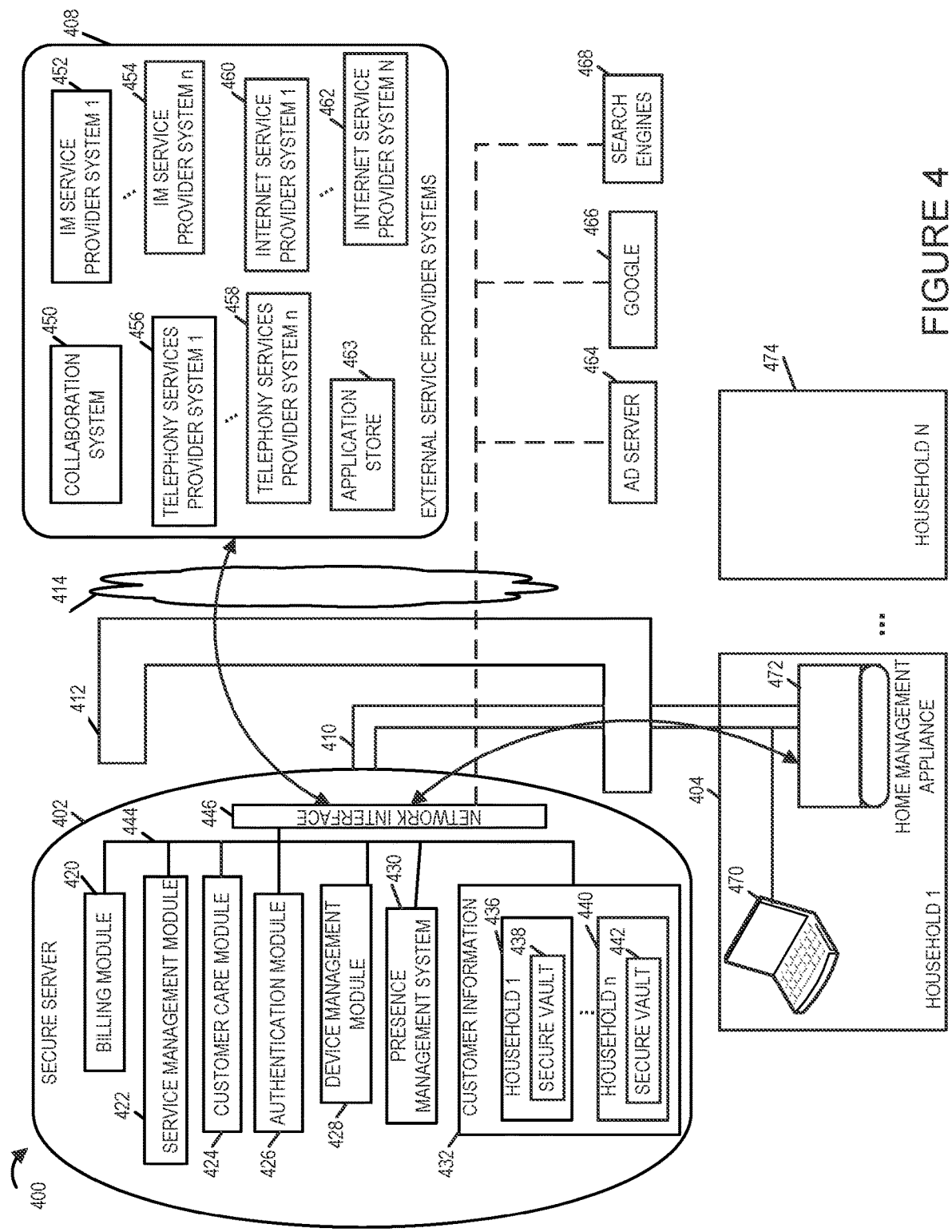
FIG. 4 is another exemplary communications system implemented in accordance with the present invention which includes more detail than is included in FIG. 1.

FIG. 4 illustrates a system 400 implemented in accordance with the present invention in more detail than the FIG. 1 illustration. As illustrated in FIG. 4, a variety of households 404, 474 include a home management appliance 472 implemented in accordance with the present invention and one or more other electronic devices 470 which can be used to access and distribute information, e.g., household member schedule information, contact information, etc.

The households 404, 474 are coupled to the secure server 402 via secure communications links such as the link 410. The secure links may pass over a public communications network such as the network 414, e.g., the Internet or public telephone network, but are secured through the use of one or more security techniques, e.g., encryption techniques. The link 410 may be a VPN communication link. A firewall 412 protects the secure server from security threats and also protects the home management appliance 472 from security threats. Commutations from the home management appliance to Internet sites, communications services, E-mail servers, etc are routed through the secure server 402 and firewall 412 to protect the home management appliance 472 from security threats without imposing the need for the user of the home management appliance to manage or even be aware of the firewall 412.

The software and/or other applications are loaded on to the home management appliance via the secure server 402. In some embodiments the user is prohibited from loading applications or software onto the home appliance except via the secure server 402. Thus, the secure server 402 can check applications before they are loaded onto the home appliance greatly reducing the threat of accidental loading of viruses and also allowing the secure server 402 to make sure that only compatible applications are loaded onto a home appliance. The secure server 402 may be responsible for updating appliance settings and configuration as applications are loaded and used in combination on the home appliance. Since home appliance configuration and management issues are implemented on the secure server 402 by the service provider, the household member using the home management appliance 472 is shielded from many device management and configuration issues commonly encountered when software and peripherals are loaded onto or added to personal computers.

The secure server 402 includes various modules in addition to customer, e.g., household information. The modules include a billing module 420, a service management module 422, a customer care module 424, an authentication module 426, a device management module 428, a presence management module 430. The various modules can interact with the home management appliance 472 via network interface 446 and also with other external systems 408 via the interface 446. The customer information 432 includes information 436, 440 corresponding to each of the households 404, 474 serviced by the secure server 402. The household information 436, 440 includes information stored in a secure manner, e.g., information stored in what is referred to as a secure vault 438, 442. The information in a household's secure vault may be encrypted and is normally backed up. The secure vault 438, 442 used to store household information may be distributed over a number of storage devices and may be implemented using a secure cloud based storage embodiment and need not be, but may be, implemented using storage internal to the secure server 402.

External service provider systems 408 which may be accessed from the home management appliance 472 via the secure server 402 include a collaboration system 450. one or more telephone service provider systems 456, 458, one or more instant message service provider systems 452, 454, an application store 463, and one or more internet service provider systems 460, 462. Various other external devices such as ad server 464, a Google server 466 and a search engine server 468 may also be accessed via the home management appliance 472 and secure server 402. While not shown in FIG. 4, one or more health care service provider systems 114 may also be accessed via home management appliance 472 and secure server 402.

The secure vault 438 can be used to store medical records, receipts, business records, photos, schedule information, to do lists, etc. with the amount of access to such information being controlled and/or restricted based on information entered via the home management appliance 472 of the household 404 to which the secure vault 438 corresponds. A user of the home management appliance 472 can manage a household's communications services, including the porting of telephone numbers and change of telephone service providers, directly from the home management appliance 472 by providing change/service management information to the secure server 402. The service provider operating the secure server 402 then contacts the various service providers which need to make changes to implement the requested communications service changes in a secure manner eliminating the need for the user of the home management appliance 472 to directly contact the individual communications service providers affected by the requested change in communications service. E-mail, instant messaging and other communications services used by household members can also be managed in a secure manner from home management appliance 472.

Figure 5:
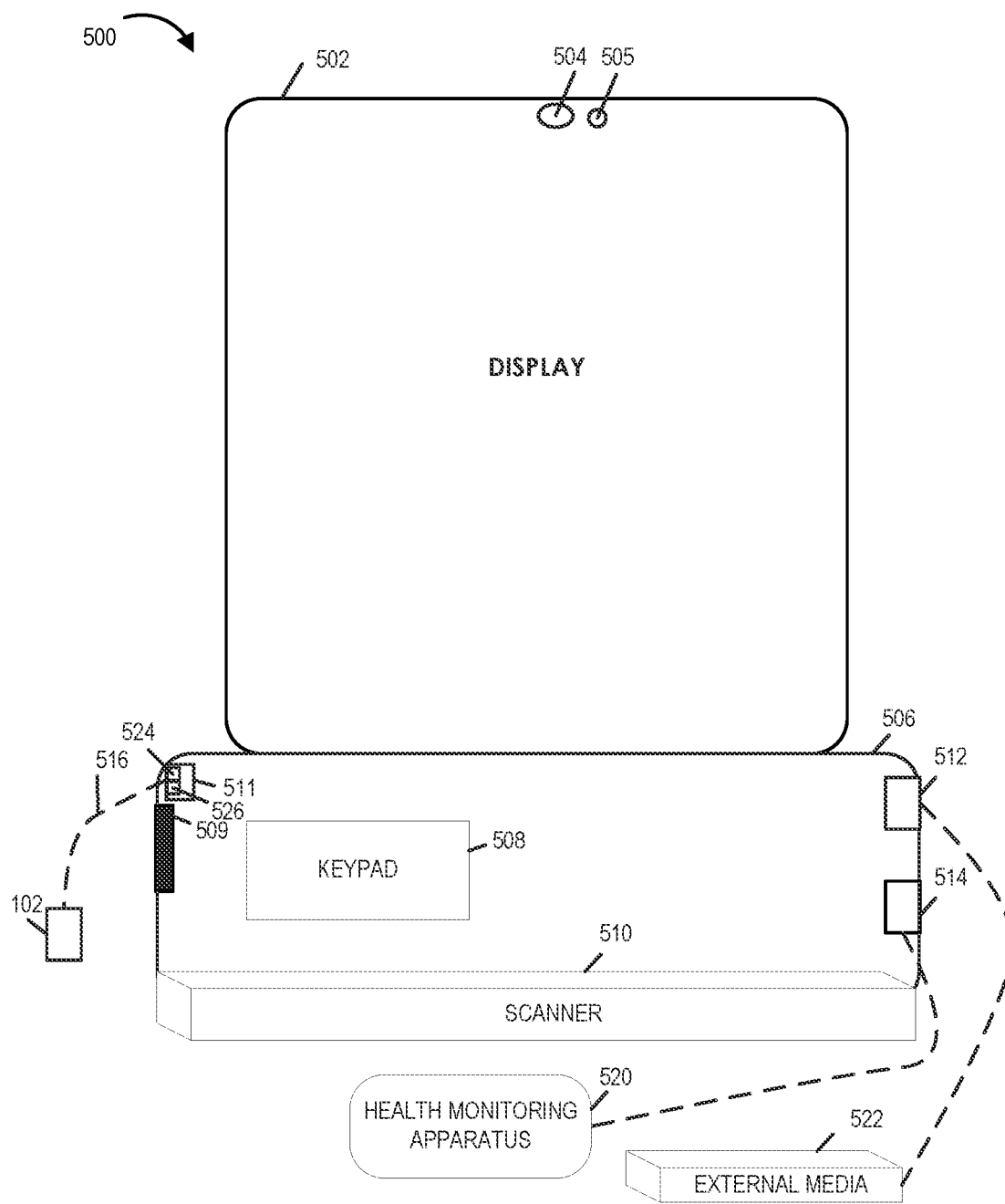
FIG. 5 illustrates a home appliance with a detachable display and scanner implemented in accordance with one exemplary embodiment.

FIG. 5 illustrates an exemplary home appliance 500 which may be used as the home appliances shown in FIGS. 1 and 4. The home appliance 500 includes a display 502, base unit 506 and scanner 510. The display device 502 may include a camera 504 and/or mic 505 and may be touch sensitive. The scanner 510 may be integrated with the base unit 506 or detachable. In some embodiments, the base unit 506 includes a keypad 508. The base unit 506 includes interfaces 512, 514 for coupling the base unit 506 to external peripheral devices such as health monitoring apparatus 520 and external media 522. The base unit 506 further includes memory card slot 509. The base unit 506 also includes an interface 511 for securely coupling the base unit 506 to the secure server 102 via a communications network 516. Interface 511 includes a receiver 524 and a transmitter 526.

Figure 6:
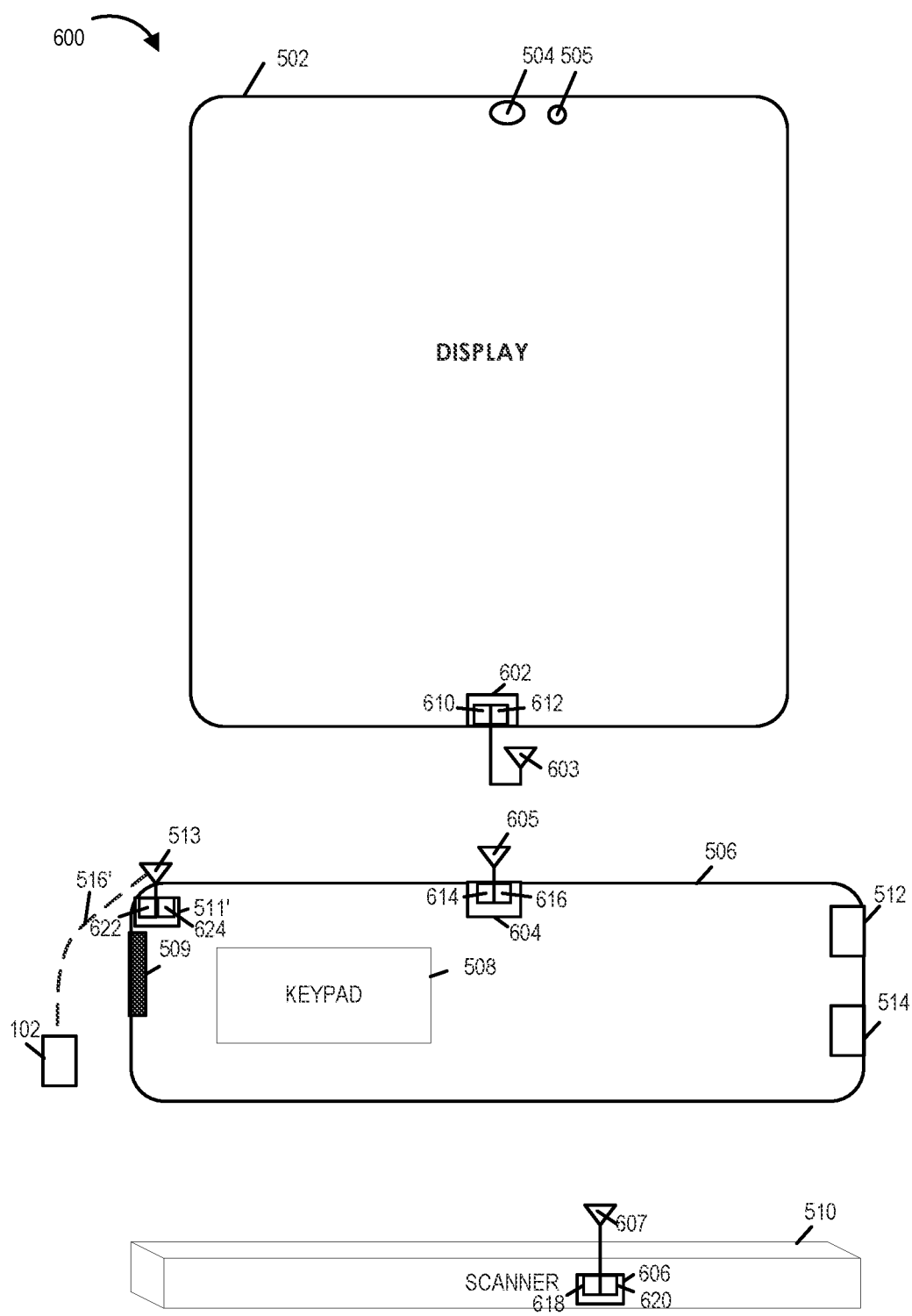
FIG. 6 shows how the components of the system shown in FIG. 5 can be detached from one another and used as they communicate wirelessly with each other.

FIG. 6 illustrates an exemplary home appliance 600 which may be used as the home appliances shown in FIGS. 1 and 4. The home appliance 600 includes a display 502, base unit 506 and scanner 510. FIG. 6 shows how, in one embodiment the display 502, base unit 506 and scanner 510 may be detached from one another. The various components (502, 506, 510) may communicate wirelessly with one another, e.g., via wireless interfaces (602, 604, 606), and corresponding antennas (603, 605, 607), respectively. Wireless interface 602 includes a wireless receiver 610 and a wireless transmitter 612. Wireless interface 604 includes a wireless receiver 614 and a wireless transmitter 616. Wireless interface 606 includes a wireless receiver 618 and a wireless transmitter 620. The display device 502 may be a tablet type device including a touch sensitive screen, display capability, some processing capability and the ability to wirelessly interact with the base unit 506, e.g., a base station, and via the base station 506, including wireless interface 511' and antenna 513' and wireless communications link 516', the secure server 102. Wireless interface 511' includes a wireless receiver 622 and a wireless transmitter 624.

Figure 7:
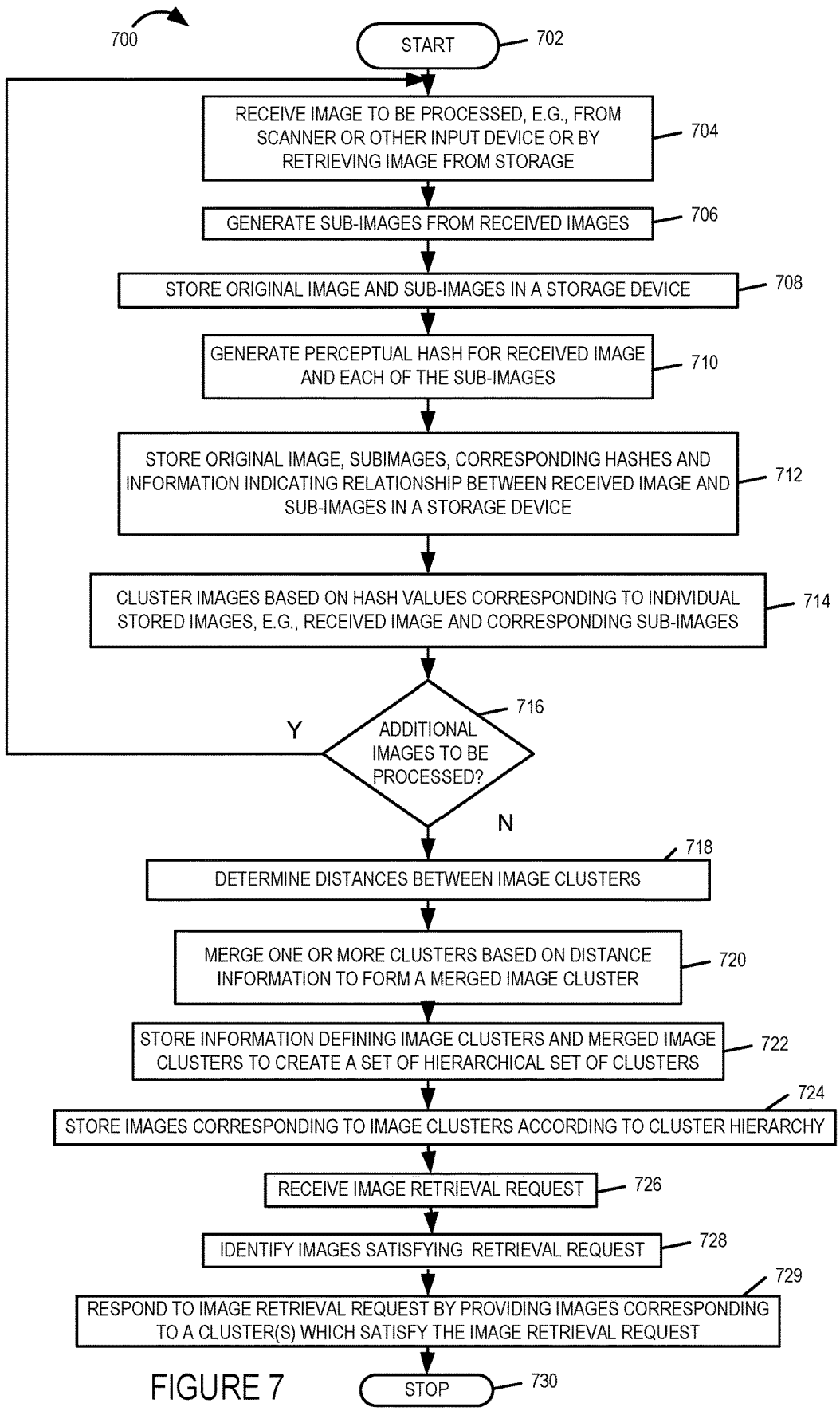
FIG. 7 illustrates the steps of an exemplary method implemented in accordance with an embodiment of the invention that involves processing of images, storing the images processing results, and responding to one or more image retrieval requests.

FIG. 7 illustrates the steps of an exemplary method 700 implemented in accordance with an embodiment of the invention that involves processing of images, storing the images and processing results, and responding to one or more image retrieval requests. The method 700 starts in step 702 when being executed by a processor, e.g., processor 306 of appliance 300 or another device such as a processor of the secure server 102. Accordingly, it should be appreciated that the method can be implemented by a customer premise device or another device including a processor and storage. For purposes of explaining the exemplary method it will be described as if implemented by a customer premises device, e.g., customer premises device 300.

The method 700 starts in step 700, e.g., when executed by processor 306 in start step 702. Operation proceeds from start step 702 to step 704, in which an image to be processed is received. The image may be, and in some embodiments is, for example, Image 1 shown in FIG. 10. The received image may be, and sometimes is, an image generated by scanning a photo, e.g., using scanner 318, an image captured by a camera such as camera 316 or an image received from another device via an interface such as interface 304 and stored in memory 302 for later retrieval and processing.

Operation proceeds from receive step 704 to sub-image generation step 706. In step 706 the received image, e.g., image 1, is divided into multiple distinct portions which are then each processed as a single image. Sub-image generation step 706 in some embodiments involves a call to a sub-image generation processing subroutine such as the routine 800 shown in FIG. 8. The sub-image processing routine 800 in some embodiments involves not only sub-images but a cropped and possibly scaled version of the received image. The processing may, and in some embodiments does, involve generation of a processed version of Image 1 which is of a predetermined size and shape. The sub-image portions can be, and in some embodiments are, re-sized to this predetermined size and shape to facilitate later processing and comparison, e.g., using hash functions generated from the sub-images.

Figure 8:
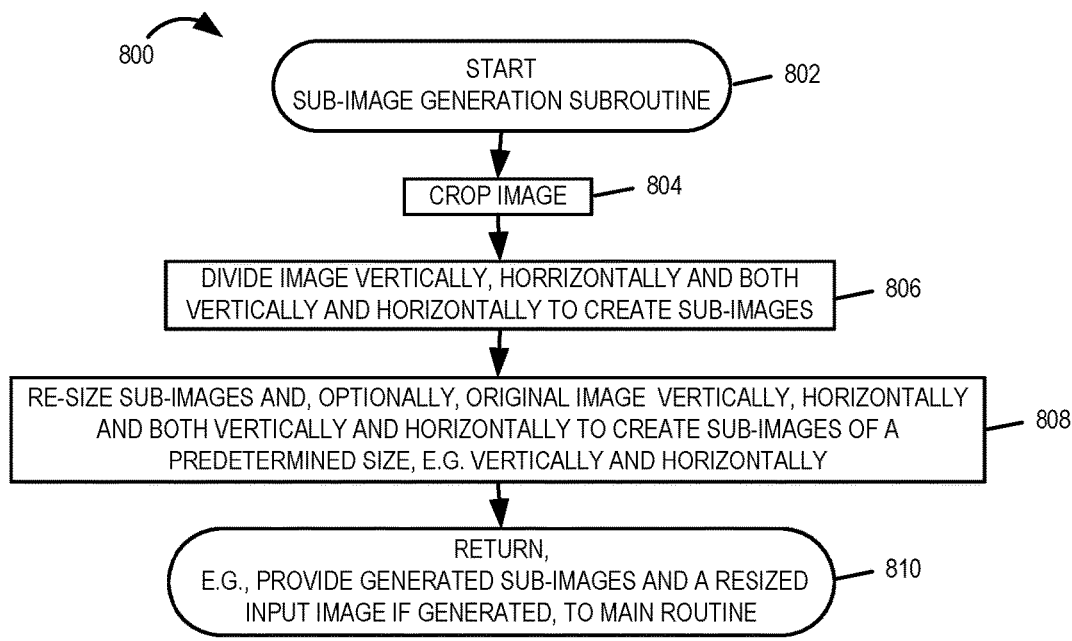
FIG. 8 illustrates an exemplary sub-image generation subroutine that can be, and sometimes is, used by the method shown in FIG. 7.

Referring now briefly to FIG. 8, which may be, and sometimes is, called in step 706, the method 800 begins in start step 802 in which the received image to be processed is received by the subroutine and then cropped in step 804, e.g., to remove blank portions of the original input image. Step 804 may be unnecessary and is avoided or skipped in some embodiments, e.g., where the input Image 1 is a complete image without any undesired content around the outside. Then in step 806 the input image, potentially having been cropped, is divided into a number of different portions. This may involve multiple different image divisions being applied to Image 1 to generate multiple different sub-images. In some embodiments the input image, Image 1, is divided vertically, horizontally and/or both vertically and horizontally to generate a plurality of sub-images with each sub-image being a separate image corresponding to a different portion of the original input image.

With the different sub-images having been created in step 806 the sub-images are then re-sized in step 808. Resizing information and which portion of the original image that each sub-image corresponds to is normally created in step 808 so that the relationship between the sub-images and original image from which they are created is clear and the sub-image can be later mapped back to the original image portion of the received Image 1 to which it corresponds. Such information can be, and sometimes is, stored with the created sub-images.

In resizing step 808 each of the sub-images is resized, e.g., scaled vertically and/or horizontally so that the sub-image will correspond to a predetermined size and shape used for hash purposes in some but not necessarily all embodiments. In step 808 the input image, Image 1, may also be resized so that a resized version of the input image is available for hash generation purposes. Once the sub-images are generated and, in some embodiments a resized version of the received image is generated, the images generated by subroutine 800 are returned to the main routine 700 and operation proceeds from step 706 to image storage step 708.

Figure 10:
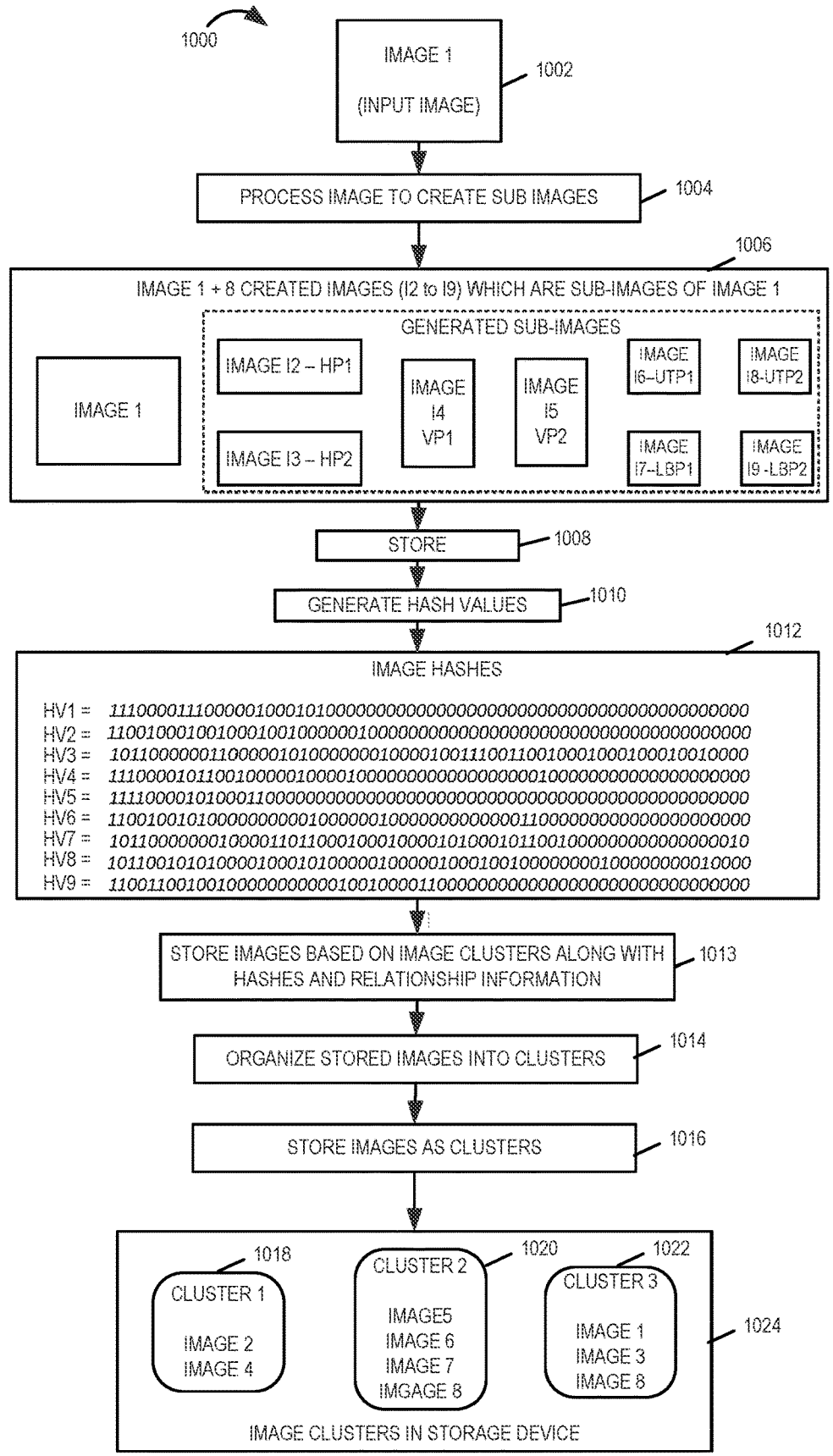
FIG. 10 is a diagram showing in a visual form images, and data generated by the method shown in FIG. 7 as a result of processing an input image.

The processing performed in sub-image generation step 706 can be understood when FIG. 10 is taken into consideration.

Image 1002 shown in FIG. 10 represents a received input image. In FIG. 10, step 1004 in some embodiments corresponds to the processing performed in step 706 and/or by the sub-image generation subroutine 800 of FIG. 8. In the FIG. 10 example the sub-images are identified as images 12 through 19 with the shape of the sub-images being shown as corresponding to the portion of the original image to which the sub-image corresponds. It should be appreciated by the end of processing due to the re-sizing step 808 the images that are stored in FIG. 7 step 708, which corresponds to FIG. 10 store step 1008, will all be of the predetermined size used for hash value generation purposes.

Referring once again to FIG. 7, it should be appreciated that in step 708 the original image, generated scaled sub-images and potentially a resized version of the original input image if the input image is different from the predetermined size, will be stored in a storage device, e.g., memory 302. Operation proceeds from storage step 708 to perceptual hash step 710 in which the input image, e.g., in resized form, and the sub-images are each processed to generate a perceptual hash value. In step 710, a separate hash value is generated for the input image and for each of the generated sub-images from the image content to which the generated hash value corresponds. A variety of perceptual hash functions could be used in step 710. In some embodiments step 710 involves a call to the exemplary hash value generation subroutine 900 shown in FIG. 9.

Figure 9:
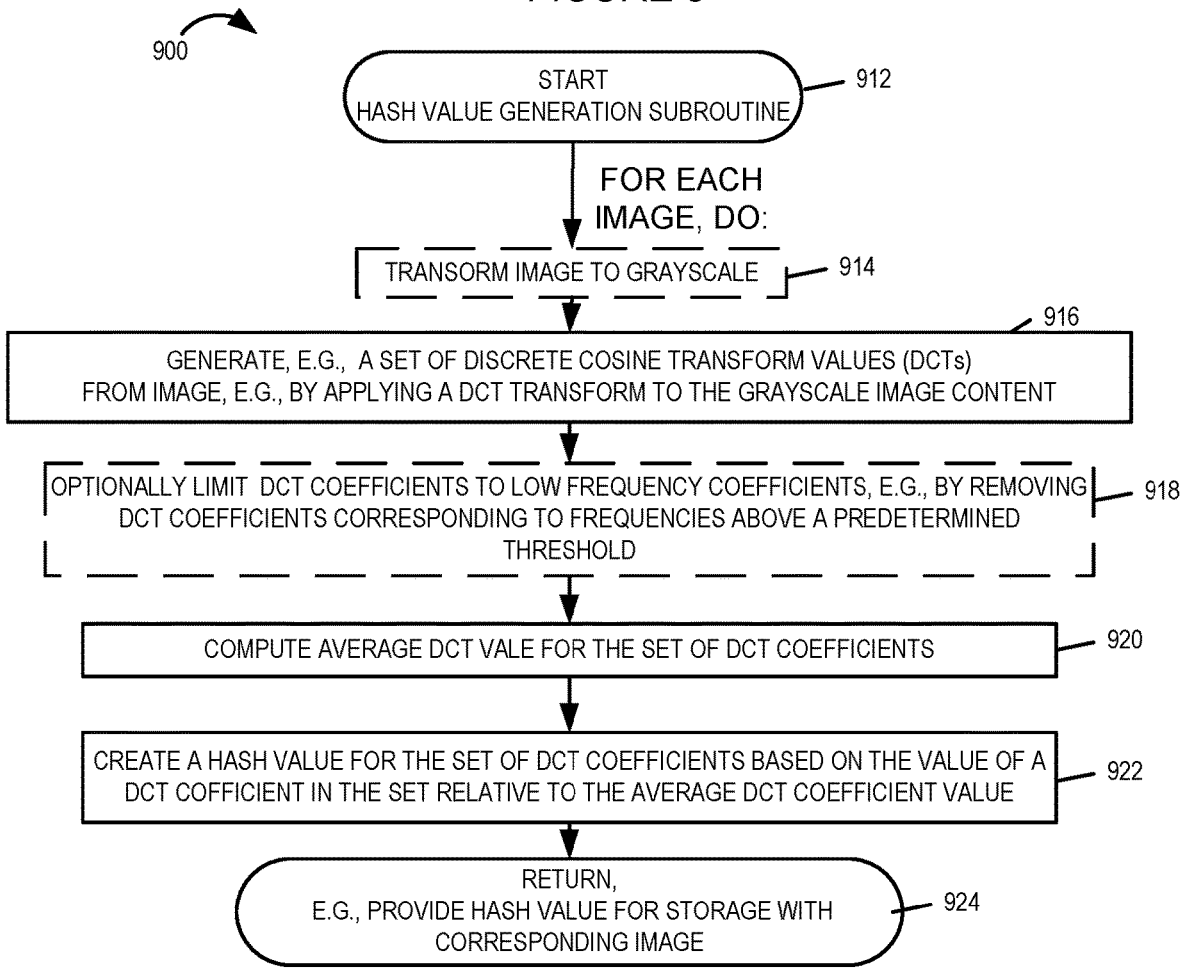
FIG. 9 shows a perspective image hash subroutine that can be, and sometimes is, used to generate hash values which are used by the method shown in FIG. 7.

Referring now briefly to FIG. 9 the exemplary hash value generation subroutine 900 will now be discussed. The subroutine 900 starts in step 912 when called, e.g., by step 710, of the method shown in FIG. 7. The images, e.g., received image resized to the predetermined size and the sub-images for which hash values are to be generated are supplied to the routine 900. Step 914 marks the start of the processing for each image for which a hash value is to be generated. Thus, it should be appreciated that steps 914 to 924 will be preformed for the received image and each sub-image being processed with one hash value being generated from the processing of each image and the hash value corresponding to the image from which the hash value was generated.

In step 914, which is used for non-grayscale images, the image being processed is transformed to grayscale. Step 914 can be skipped if the input image is already a grayscale image. Operation proceeds from step 914 to step 916 or directly from step 912 to step 916 if the input image is a grayscale image. In step 916 Discrete Cosine Transform (DCT) processing is performed on the input values, e.g., pixel values, representing the image. This may be done on a block or other basis with blocks of pixel values being processed to generate one or more DCT values. Image compression routines which perform DCT processing can be, and sometimes are, used to perform the DCT generation operation. Thus, in step 916 a set of DCT values are generated from the grayscale image which was received or generated in step 914. The DCT values are then, in some embodiments, processed in step 918 or supplied directly to step 920 in embodiments where optional step 918 is not performed.

In optional step 918 DCT coefficients are limited to low frequency coefficients, e.g., by removing DCT coefficients corresponding to frequencies above a predetermined frequency threshold. In step 920 in some embodiments the DCT coefficients are limited to DC DCT coefficients but in other embodiments some non-DC coefficients are included in the DCT coefficients which are not filtered out and allowed to pass to steps 920 and 922. In step 920 the DCT coefficients passed by filtering step 918 are processed to compute an average DCT coefficient value for the set of coefficients being processed. Then in step 922 a hash value for the set of coefficients corresponding to the image being processed is generated based on the value of the DCT coefficients in the set being processed, e.g., the coefficients which made it past filtering step 918 and the average DCT coefficient value. The generated hash value may include one binary value for each DCT coefficient depending on how it compares to the average DCT coefficient value but other approaches to determine the hash value for the image could be used.

With the hash value for the image having been created in step 922 it is returned to the routine which called the subroutine 900 and associated with the image or sub-image to which the hash value corresponds.

Referring to FIG. 10, the operation performed by subroutine 900 corresponds to generate hash values step 710 of FIG. 7 and the representation of this step as step 1010 in FIG. 10. The hash values generated in step 710, 1010 are shown in box 1012 of FIG. 10. Hash value HV1 correspond to the received image, Image 1. Hash value HV2 corresponds to Image 2 which is the first horizontal image portion (I2, HP1). Hash value HV2 corresponds to Image 3 which is the second horizontal image portion (I3, HP2). Hash value HV4 corresponds to Image 4 which is the first vertical image portion (I4, VP1). Hash value HV5 corresponds to Image 5 which is the second vertical image portion (I3, VP2). Hash value HV6 corresponds to Image 6 which is the first upper top portion (I6, UTP1. Hash value HV7 corresponds to Image 7 which is the first lower bottom portion (I7, LBP1). Hash value HV8 corresponds to Image 8 which is the second upper top portion (I8, UTP2). Hash value HV9 corresponds to Image 9 which is the second lower bottom portion (I9, LBP2).

In FIG. 10 storage step 1012 is shown in which the input image (I1), generated sub-images (I2-I9) are stored along with the corresponding hash values and in some embodiments, information indicating the positional relationship between the content of the sub-image and the original image I2. If the sub-images are stored in scaled form information on the scaling used to generate the sub-images and/or required to convert the scaled sub-image back into the original images portions may be, and sometimes is, also stored. In other embodiments the sub-images are stored as the original image portions and can be scaled as needed, e.g., if they are to be displayed in response to a display retrieval and/or display request.

Staying with the description of FIG. 10, the stored images are subsequently organized into clusters in step 1014 and then stored, e.g., arranged, in the storage device based on the determined cluster arrangement. This can, and sometimes does, involve storing the images in a hierarchical arrangement potentially with clusters at different levels with some clusters corresponding to a combination of lower level clusters where the images in a cluster may be selected based on how closely the image hash values match one another.

Element 1024 shows a single level of image clusters, where the level includes 3 groups of images, e.g., clusters.

Cluster 1 1018 includes images 2 and 4, cluster 2 1020 includes images 5, 6, 7 and 9, cluster 3 1022 includes images 1, 3 and 8.

Returning once again to the description of the exemplary method shown in FIG. 7, in step 710 the perceptual hash value for each of the received images and generated sub-images were produced in step 710 then in step 712 they are stored along with the original and sub-images along with relationship information indicating the relationship between each sub-image and the original image used to generate particular set of sub-images that are being stored in step 712. From storage step 712 operation proceeds to step 714. In step 714 images are clustered based on the hash values corresponding to the individual stored images, e.g., the received image and the corresponding sub-images. A simple comparison of hash values may be used to perform step 714 with hash values that are similar being grouped together, e.g., based on being within some difference threshold. In other embodiments AI based methods for clustering are used to group the images into clusters, e.g., a user determined number of clusters. In some embodiments an image is located in one cluster at a given level. Thus, in the example shown in FIG. 10, each of the images I1 through I9 allocated to a single cluster at the illustrated cluster level with the total number of clusters being 3 at the illustrated level.

With the processing of one input image having been completed in step 714 and at least some image clusters having been generated, in step 716 a check is made as to whether another image has been received for processing. If an additional image is to be processed, the image is received, e.g., at the processor after it is supplied by the scanner or retrieved from storage, and then steps 704 through 714 are performed to generate sub-images and cluster the images corresponding to the additional image.

As a result of processing one or more images, multiple image clusters will have been generated. Operation proceeds from step 716 to step 718 once the images waiting to be processed have been initially processed and clustered.

In step 718 distances between image clusters are determined, e.g., based on the hash values of the images included in each cluster. The in step 720 a decision is made to merge one or more clusters into a new cluster, e.g., corresponding to another level having fewer clusters than the level corresponding to the clusters processed in step 718. The number of clusters for this new level may be predetermined, user configured or some fraction, e.g., ½) of the number of clusters at the level of clusters being processed in step 718. The amount of cluster merging will be based on the number of clusters to be included in the new cluster level generated by merging step 720. Once the cluster merging has been completed in step 720, the information defining the clusters in the new cluster level is stored in step 722. The images can also be stored with this information or pointers to the images on the storage device can be used to avoid having to store the same image multiple times as it is assigned to clusters at different levels of the cluster hierarchy which is generated. Step 724 involves storing images corresponding to the images clusters according to the cluster hierarchy. This may involve storing images in different directories corresponding to different clusters, e.g., with one copy of the image being stored in a directory corresponding to a cluster and thus multiple copies of an image being stored or with pointers being used to indicate the location of an image which can be accessed based on selection of a cluster level or cluster at a given level.

With the cluster hierarchy and hash values having been generated and stored operation proceeds to step 724 in which the stored images can be used to satisfy one or more retrieval requests. In step 726 an image retrieval request is received. This retrieval request may be for images which include a portion of an input image or which include content similar to a portion of an input image. A hash value can be generated for the input image which is part of the retrieval request and compared to the hash values for different clusters. A user can specify how closely the retrieved image should match the input image and/or the number of images to be returned.

In step 728 one or more image clusters satisfying the image retrieval request are identified and then in step 729 the images in the identified clusters are provided to the user who made the image retrieval request, e.g., and displayed on the display 308.

Operation is shown as proceeding from step 729 to stop step 730 but it should be appreciated that a user may enter another retrieval request which would be processed in step 724 or additional images could be submitted for processing and clustering which would invoke step 704. Accordingly, the stop step 730 is primarily for conceptual and explanation purpose and not intended to indicate that additional images could not be processed or that additional retrieval requests can not be received and processed.

FIG. 8 illustrates an exemplary sub-image generation subroutine that can be, and sometimes is, used by the method shown in FIG. 7.

FIG. 9 shows a perspective image hash subroutine that can be, and sometimes is, used to generate hash values which are used by the method shown in FIG. 7.

FIG. 10 is a diagram showing in a visual form images, and data generated by the method shown in FIG. 7 as a result of processing an input image.

Figure 11A:
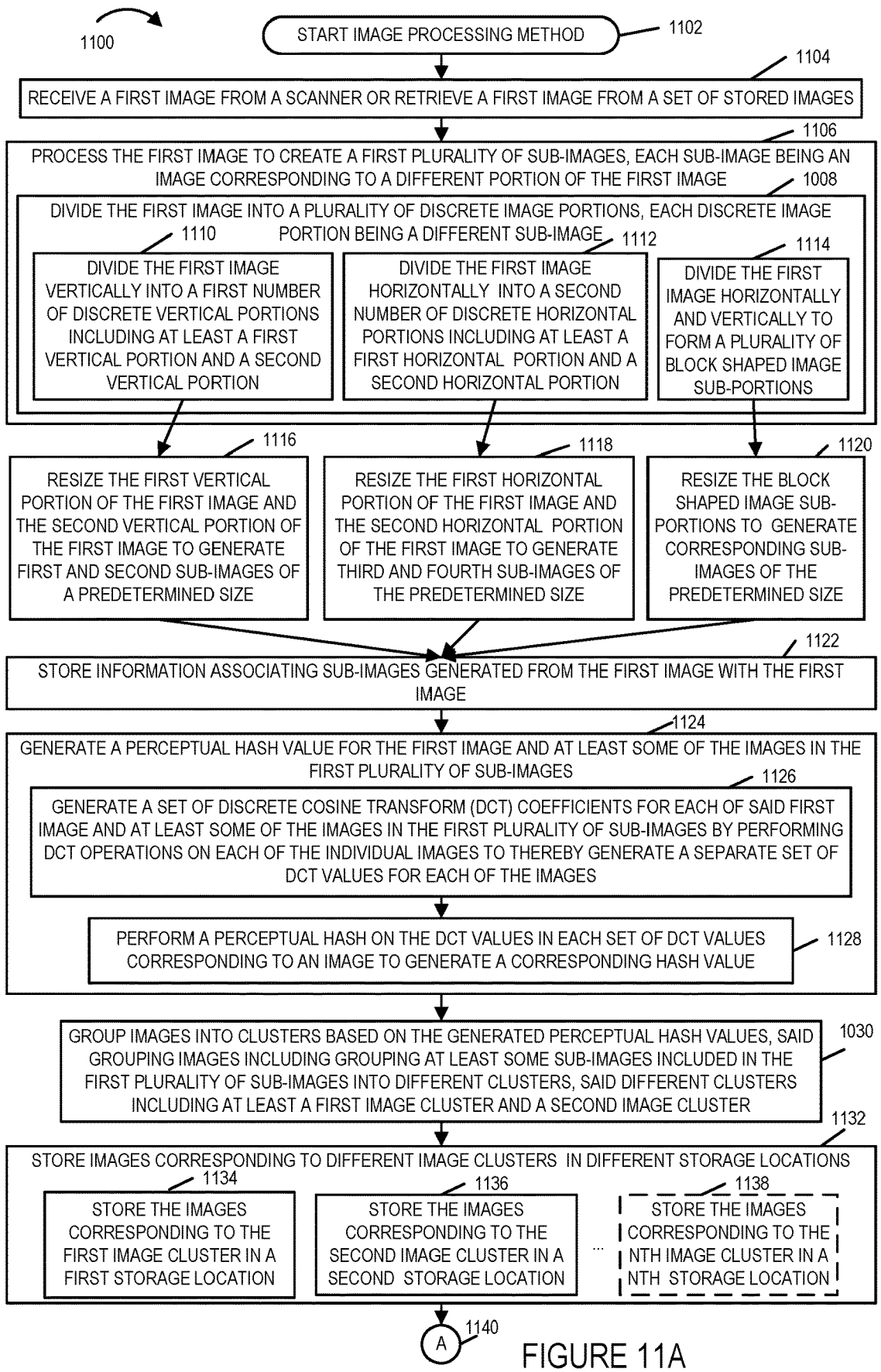
FIG. 11A shows a first part of a flow chart which shows the steps of another embodiment implemented in accordance with the invention.

FIG. 11A shows a first part of a flow chart which shows the steps of another embodiment implemented in accordance with the invention.

Figure 11B:
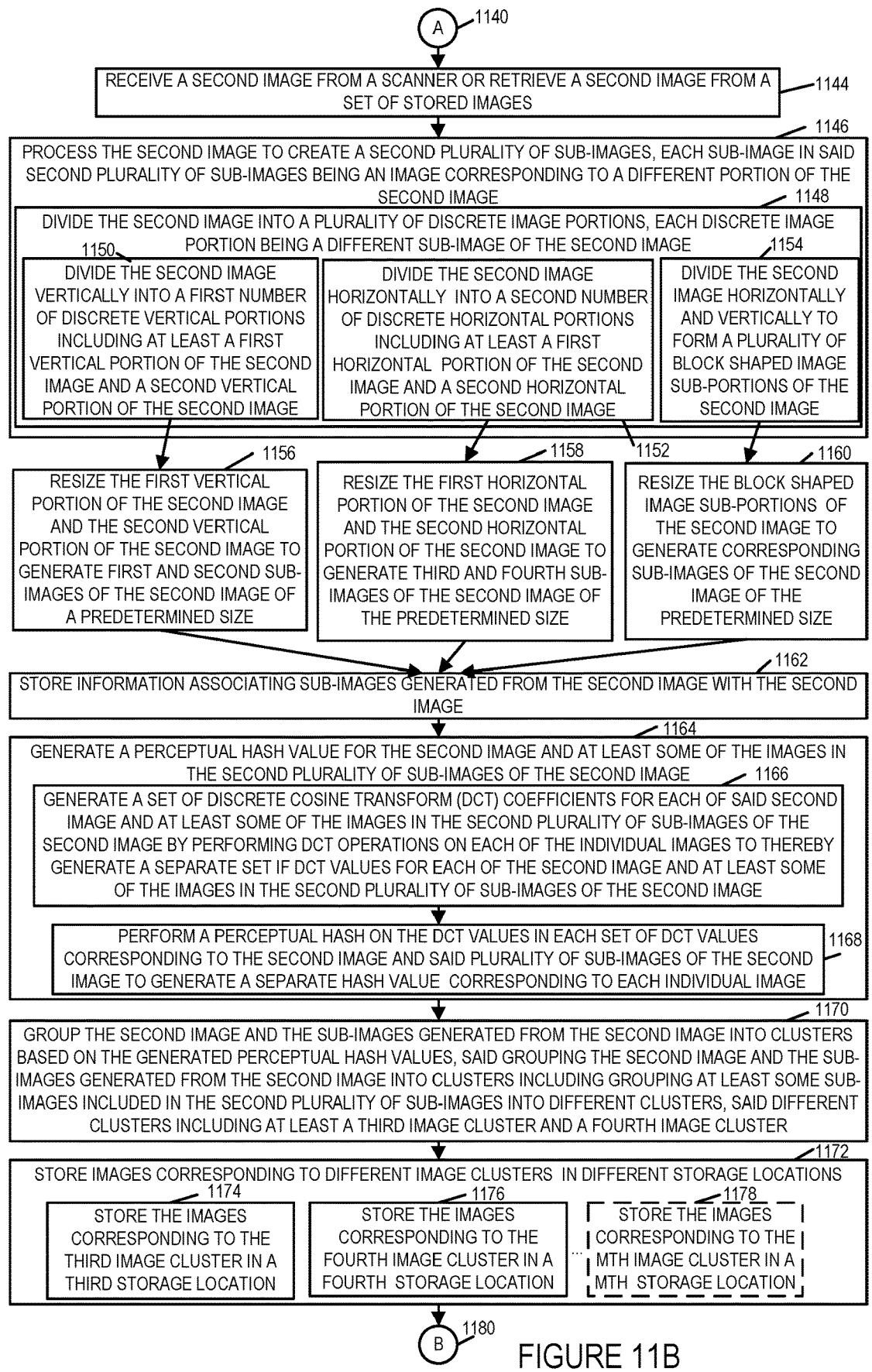
FIG. 11B shows a second part of a flow chart which shows the steps of another embodiment implemented in accordance with the invention.

FIG. 11B shows a second part of a flow chart which shows the steps of another embodiment implemented in accordance with the invention.

Figures 11, 11A, 11B, 11C:
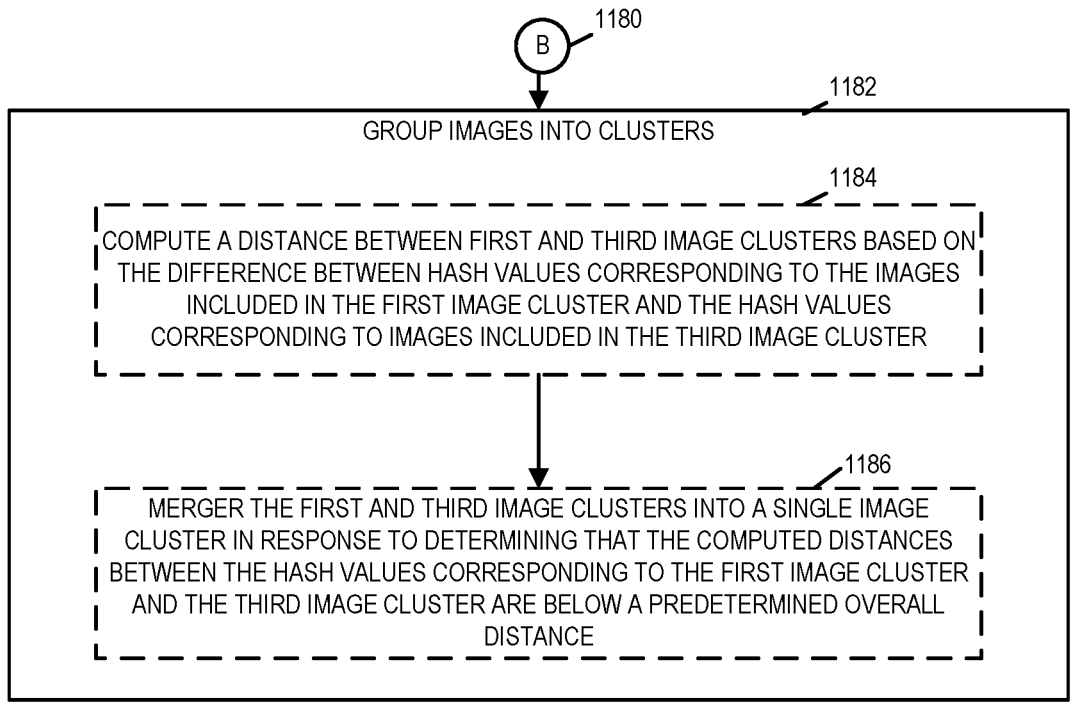
FIG. 11C shows a third part of a flow chart which shows the steps of another embodiment implemented in accordance with the invention.
FIG. 11 is a diagram showing how FIG. 11A, FIG. 11B and FIG. 11C can be combined to form a single flow chart showing the steps of an exemplary embodiment.

FIG. 11C shows a third part of a flow chart which shows the steps of another embodiment implemented in accordance with the invention.

FIG. 11 is a diagram showing how FIG. 11A, FIG. 11B and FIG. 11C can be combined to form a single flow chart showing the steps of an exemplary embodiment.

FIG. 11, comprising the combination of FIG. 11A, FIG. 11B and FIG. 11C, is a flowchart 1100 of an exemplary image processing method in accordance with an exemplary embodiment. Operation starts in step 1102 in which the image processing device, e.g., home computer or server including a processor, is powered on and initialized. Operation proceeds from step 1102 to step 1104.

In step 1104, the processor receives a first image from a scanner or retrieves a first image from a set of stored images, e.g., a set of stored images including at least some scanned or captured images such as photographs and optionally some images which were generated by processing photographs. Operation proceeds from step 1104 to step 1106. In step 1106 the processor processes the first image to create a first plurality of sub-images, each sub-image being an image corresponding to a different portion of the first image. Step 1106 includes step 1108 in which the processor divides the first image into a plurality of discrete image portions, each discrete image portion being a different sub-image of the first image. Step 1108 includes steps 1110, 1112 and 1114. In step 1110 the processor divides the first image vertically into a first number of discrete vertical portions including at least a first vertical portion and a second vertical portion. In step 1112 the processor divides the first image horizontally into a second number of discrete horizontal portions including at least a first horizontal portion and a second horizontal portion. In step 1114 the processor divides the first image horizontally and vertically to form a plurality of block shaped image sub-portions. Operation proceeds from steps 1110, 1112, and 1114, to step 1116, 1118, and 1120, respectively.

In step 1116 the processor resizes the first vertical portion of the first image and the second vertical portion of the first image to generate first and second sub-images of a predetermined size. In step 1118 the processor resizes the first horizontal portion of the first image and the second horizontal portion of the first image to generate third and fourth sub-images of the predetermined size. In step 1120 the processor resizes the block shaped image sub-portions to generate corresponding sub-images of the predetermined size. Operation proceeds from steps 1116, 1118 and 1120 to step 1122.

In step 1122 the processor stores image association sub-images generated from the first image with the first image. Operation proceeds from step 1122 to step 1124.

In step 1124 the processor generates a perceptual hash value for the first image and at least some of the images in the first plurality of sub-images. Step 1124 includes steps 1126 and 1128. In step 1126 the processor generates a set of discrete cosine transform (DCT) coefficients for each of said first image and at least some of the images in the first plurality of sub-images by performing DCT operations one each of the individual images to thereby generate a separate set of DCT values for each of the images. Operation proceeds from step 1126 to step 1128. In step 1128 the processor performs a perceptual hash on the DCT values in each set of DCT values corresponding to an image to generate a corresponding hash value. Operation proceeds from step 1124 to step 1130.

In step 1130 the processor groups images into clusters based on the generated hash values, said grouping images including grouping at least some sub-images included in the first plurality of sub-images into different clusters, said different clusters including at least a first image cluster and a second image cluster. Operation proceeds from step 1130 to step 1132.

In step 1132 the processor stores images corresponding to different image clusters in different storage locations. Step 1132 includes step 1134, 1136, and, in some embodiments, step 1138. In step 1134 the processor stores the images corresponding to the first image cluster in a first storage location. In step 1136 the processor stores images corresponding to the second image cluster in a second storage location. In step 1138 the processor stores image corresponding to an Nth image cluster in an Nth storage location. Operation proceeds from step 1132, via connecting node A 1140, to step 1144.

In step 1144, the processor receives a second image from a scanner or retrieves a second image from a set of stored images. Operation proceeds from step 1144 to step 1146. In step 1146 the processor processes the second image to create a second plurality of sub-images, each sub-image being an image in said second plurality of sub-images being an image corresponding to a different portion of the second image. Step 1146 includes step 1148 in which the processor divides the second image into a plurality of discrete image portions, each discrete image portion being a different sub-image of the second image. Step 1148 includes steps 1150, 1152 and 1154. In step 1150 the processor divides the second image vertically into a first number of discrete vertical portions including at least a first vertical portion of the second image and a second vertical portion of the second image. In step 1152 the processor divides the second image horizontally into a second number of discrete horizontal portions including at least a first horizontal portion of the second image and a second horizontal portion of the second image. In step 1154 the processor divides the second image horizontally and vertically to form a plurality of block shaped image sub-portions of the second image. Operation proceeds from steps 1150, 1152, and 1154, to step 1156, 1158, and 1160, respectively.

In step 1156 the processor resizes the first vertical portion of the second image and the second vertical portion of the second image to generate first and second sub-images of the second image a predetermined size. In step 1158 the processor resizes the first horizontal portion of the second image and the second horizontal portion of the second image to generate third and fourth sub-images of the second image of the predetermined size. In step 1160 the processor resizes the block shaped image sub-portions of the second image to generate corresponding sub-images of the second image of the predetermined size. Operation proceeds from steps 1156, 1158 and 1160 to step 1162.

In step 1162 the processor stores image association sub-images generated from the second image with the second image. Operation proceeds from step 1162 to step 1164.

In step 1164 the processor generates a perceptual hash value for the second image and at least some of the images in the second plurality of sub-images of the second image. Step 1164 includes steps 1166 and 1168. In step 1166 the processor generates a set of discrete cosine transform (DCT) coefficients for each of said second image and at least some of the images in the second plurality of sub-images of the second image by performing DCT operations one each of the individual images to thereby generate a separate set of DCT values for each of the second image and at least some of the images in said second plurality of sub-images of the second image. Operation proceeds from step 1166 to step 1168. In step 1168 the processor performs a perceptual hash on the DCT values in each set of DCT values corresponding to the second image and said plurality is sub-images of the second image to generate a separate hash value corresponding to each individual image. Operation proceeds from step 1164 to step 1170.

In step 1170 the processor groups the second image and the sub-images generated from the second image into clusters based on the generated perceptual hash values, grouping the second image and the sub-images generated from the second image into clusters including grouping at least some images include in the second plurality of sub-images into different clusters, said different clusters including at least a third cluster and a fourth image cluster. Operation proceeds from step 1170 to step 1172.

In step 1072 the processor stores images corresponding to different image clusters in different storage locations. Step 1172 includes step 1174, 1176, and, in some embodiments, step 1178. In step 1074 the processor stores the images corresponding to the third image cluster in a third storage location. In step 1176 the processor stores images corresponding to the fourth image cluster in a fourth storage location. In step 1178 the processor stores images corresponding to an Mth image cluster in an Mth storage location. Operation proceeds from step 1172, via connecting node B 1180 to step 1182.

In step 1182 the processor further groups images into clusters. Step 1182, in some embodiments, includes steps 1184 and 1186. In step 1184 the processor computes a distance between first and third image clusters based on the difference between hash values included in the first image cluster and hash values corresponding to images included in the third image cluster. Operation proceeds from step 1184 to step 1186. In step 1186 the processor mergers the first and third image clusters into a single image cluster in response to determining that the computed distances between hash values corresponding to the first image cluster and the third image cluster are below a predetermined overall distance.

Figure 12A:
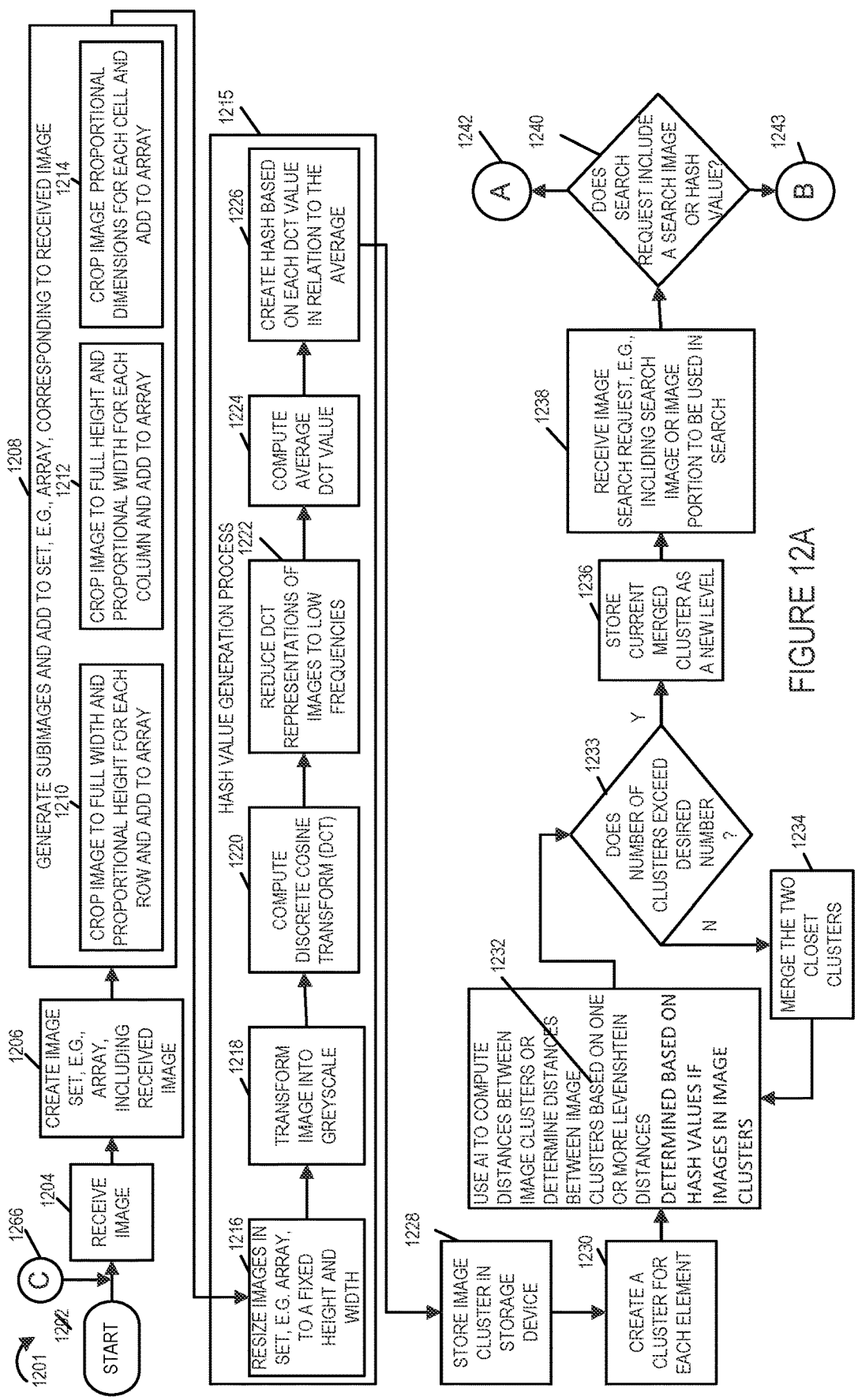
FIG. 12A shows the steps of a first part of an exemplary method implemented in one embodiment.
Figure 12:
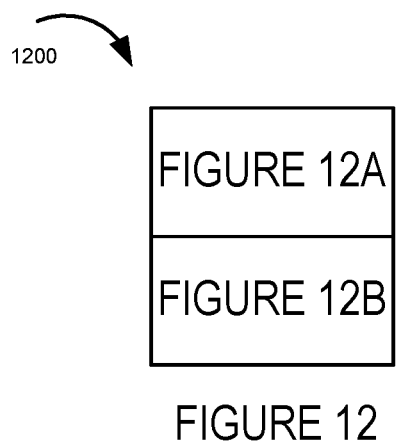
FIG. 12 shows how the flow charts of FIG. 12A and FIG. 12B can be combined to show the set of steps of the exemplary method.

FIG. 12 is a diagram 1200 showing how FIGS. 12A and 12B can be combined. FIG. 12A illustrates the steps 1201 of the first part of another exemplary method, shown in FIG. 12, implemented in accordance with an embodiment of the invention that involves processing of images. The processing can include storing the images and processing results, responding to one or more image retrieval requests, e.g., search requests, displaying of search results, receiving of user input relating to the search results and/or image processing operations such as image deletion, supplementing with audio and/or text, and/or image modification.

The method 1200 (which comprises the combination of the steps of FIGS. 12A and 12B) starts in step 1202 when being executed by a processor, e.g., processor 306 of appliance 300 or another device such as a processor of the secure server 102. Accordingly, it should be appreciated that the method can be implemented by a customer premise device or another device including a processor and storage. For purposes of explaining the exemplary method it will be described as if implemented by a customer premises device, e.g., customer premises device 300.

The method shown in FIG. 12 begins in start step 1202 with the processor of the device implementing the method controlling the device to begin performing the steps of the method. Operation proceeds from step 1202 to step 1204 in which an image, e.g., an image to be stored is received for processing. Then in step 1206 an image set, e.g., image array, is created corresponding to the received image and the received image is added to the array, e.g., stored in memory 302 as part of the stored data, e.g., photos 340. At this point the image array corresponding to received image includes the received image but not related images which are generated from the received image in accordance with one feature of the invention. With the received image having been stored, e.g., in memory, operation proceeds to sub-image generation and storage step 1208 in which the received image is cropped and images created from the cropped images. Step 1208 includes one or more of substeps 1210, 1212, 1214. In step 1210 the image is cropped to form multiple full width portions, e.g. resulting in one image for each row of a predetermined vertical image portion size being created. Thus step 1210 creates images of horizontal portions of the received input image, e.g., with each image created being a different horizontal slice of the original image. The images created in substep 1210 are added to the set of images, e.g., array to which the original received image was added. The sub-image creation in step 1208 may be the same or similar to the sub-image creation performed in step 1004 of FIG. 10. In step 1212 the image is cropped to form multiple full height portions, e.g. resulting in one image for each column of a predetermined width with multiple images being created. Thus step 1212 creates images of vertical portions of the received input image, e.g., with each image created being a different vertical slice (e.g., column image portion) of the original image. Information indicating the original image and the portion of the original image to which the created image corresponds is stored in some embodiments along with the original received image and created images. The images created in substep 1212 are added to the set of images, e.g., array to which the original received image was added. In substep 1214 the image is divided into multiple similarly shaped images, e.g., by cutting the image into a number of non-overlapping portions, e.g., 4 quarter sections. These images are also added to the image set corresponding to the received image. At the end of step 1208 the images in the array may be the same or similar to those stored in step 1006 of FIG. 10. Operation proceeds from sub-image creation step 1028 to a series of steps used in generating perceptual hash values, one per image or sub-image, which are suitable for use in image comparison with the same or similar hash values indicating a match between the content of two images. Steps 1216-1226 may be considered steps of a hash value generation process step 1215.

In step 1216 resizing is performed with the received image and/or images created in step 1208 being resized to a fixed height and width. The resized images can be and sometimes are stored with the original images for use in subsequent processing while the original image and/or created images can be returned at a later stage in response to a user query. The resized images are stored in the image set corresponding to the received image are resized to a fixed height and width for processing. Then in step 1218 the images are converted to grayscale. In step 1220 DCT (discrete cosine transform) processing is performed on the grayscale images to produce a set of DCT coefficients for each greyscale image. The DCT coefficients corresponding to an image are filtered in step 1222 to reduce the coefficients to a set of low frequency coefficients. The low frequency coefficients preserve significant image features while removal of high frequency coefficients removes some details. The filtered set of coefficients can and is used as a set of significant image feature information for image comparison purposes. In step 1224 an average DCT value is computed from the step for filtered coefficients generated in step 1222. Next in step 1226 the set of DCT coefficients resulting from the filtering is hashed, e.g., in relation to the average DCT value computed in step 1224. Known perceptual hash functions used to support image comparison based on comparison of hashed values may be used for this purpose. pHash is an open source perceptual hash library that includes one or more hash functions which can be used to implement the hash operation.

Since the processing removed high frequency coefficients the hash of the DCT is a function of the main image features. Other images with a matching hash will have the same or similar significant features. Since the original image is processed to create sub-images, and a hash created for each sub-image, when a search is conducted using another image as a search input a match may occur between a sub-image created from the image serving as search input. Thus, when searching images, because of the generation of a group of sub-images for both each stored received image and search image, a match may be made based on hash matching of sub-images. Thus, while the hash value of a received image may not match the hash value of a search image because the majority of the images are different, a search match is still likely to result if a portion of the image represented by a generated sub-image matches the hash value of a sub-image corresponding to one of the stored images. This provides a powerful search option where images with small portions matching each other, e.g., due to the presence of a person, house or other object in a portion of the stored image and search image will result in a search match even where the portions are not identical but have much of the same content as can be expected in the case of a building or other scene area appearing in both the stored image and the search input image.

The hashes generated in step 1226, one for each image in the set of images corresponding to the received image, are stored in a storage device in step 1228 in a manner which associates the hash with the original image or sub-image to which it corresponds. In this way for each stored image of an image set there is a corresponding stored hash value which can be used for search purposes.

In step 1230 the generated set of images including the image received in step 204 and the images generated in sub-image generation step 1208 are arranged into an image cluster. In some embodiments each image cluster is then processed to determine the image cluster distance, in terms of an artificial intelligence determined distance measure, from other image clusters included in image storage. In step 1232 in some embodiments an AI application is used to compute distances between image clusters. In other embodiments In other embodiments one or more Levenshtein distances (LD) are determined based on the hash values of the images in each of the clusters which may be combined. The Levenshtein distance (LD) is a measure of the similarity between two strings, e.g., image hash values, which we will refer to as the source string (s) and the target string (t). The distance is the number of deletions, insertions, or substitutions required to transforms into t.

After a distance is computed between the image clusters, then in step 1233 a check is made to determine if the number of image clusters exceeds a desired maximum number of image clusters, e.g., which is a user set or otherwise predetermined number. If the number of images clusters stored in the storage device 302 exceeds the desired maximum number operation proceeds to step 1234 in which the pair of image clusters which are closest in distance are merged, e.g., combined, into a single image cluster thereby reducing the total number of image clusters. Thus, in the case of merging of image clusters multiple original stored images and their corresponding sub-images are stored as set, e.g., cluster. Operation than proceeds to step 1232 wherein the distance between the clusters in the newly reduced number of clusters is determined and a check is made once again n step 1233 to see if the current number of stored image clusters exceeds the desired number.

If in step 1233 it is determined that the number of image clusters does not exceed the maximum number, operation proceeds to step 1236 in which the generated merged cluster is indicated as corresponding to a new level in the storage device, e.g., in cases where image clusters are stored in a hierarchal structure.

The stored image clusters and corresponding hash values are used to support image searches. In step 1238 an image search request is received. In some embodiments, the image search can and does include an image portion which could be a full image or a cropped portion of an image. A perceptual hash value can also be used as a search input. Operation proceeds from search input step to step 1240 in which processing is branched based on whether an image was provided as the search input, and thus requiring generation of a hash value to support comparison, or whether a hash value was received in the search input. If a perceptual hash value was received, operation proceeds from step 1240 directly to step 1252 (shown in FIG. 12B) via connecting node B 1243. However, if an input image was received as part of the search request operation proceeds via connecting node 1242 to step 1244.

In step 1244 the received search input image, referred to as search image SI1, is processed to create sub-images. The processing can be the same as or similar to the processing performed in step 1106 of FIG. 11A in which the received image is segmented into multiple distinct portions referred to as sub-images. The sub-images generated in step 1244 are included in step 1246 as part of a set of search images. The set of search images are then stored, e.g., in memory, in step 1248 for further processing. Then in step 1250 which is a hash value generation process step, the hash values are generated for each image in the step of search images in step 1250. Step 1250 can include the same or similar processing to that performed in previously discussed hash value generation process step 1215. Accordingly, while the substeps shown in step 1215 are not shown again in step 1250 they may be and sometimes are part of step 1250. At the end of step 1250 a hash value will be available for each received image and generated subimage corresponding to the received search image.

Operation proceeds from step 1250 to step 1252. As discussed above when a hash value is provided as the search input operation would also proceed to step 1252 so that the received hash will be compared to the stored hash values of the stored images and corresponding sub-images just as occurs when the has values for a search image are generated in step 1250.

In step 1252 stored images corresponding to the received search input, e.g., search image or input hash are identified by comparing hash values of the received search image and corresponding sub-images or the received hash value, to the hash values of stored images and/or sub-images. Thus, in step 1252 images which match with the input image or a portion of the input image are identified and/or images having hash values corresponding to the input hash value are identified. A match is determined in some cases by comparing a search hash value to a stored image or sub-image hash value and declaring a match when the two hash values are within a predetermined amount of each other which in the case of a perceptual hash is indicative of image similarity. In some embodiments step 1252 includes sub step 1254 which involves comparing a hash value of a search image and/or hash values of one or more search sub-images to hash values of stored images and/or sub-images to identify images within a predetermined range of each other. The amount of difference between hash values for images to be considered a match may be fixed, e.g., a predetermined stored threshold value, or user configurable (e.g., user settable) depending on the embodiment.

With stored images with matching hash values to the hash values of a search image or subimages of a search image having been identified in step 1252, the matching images are supplied to a user, e.g., by providing the stored matching images to a user device which then displays the search results in step 1258. The matching images which are returned are, in some embodiments the original images of each stored image cluster found to include a matching image. Thus, in some embodiments when an image cluster includes a image or sub-image which matches that of a search image, search sub-image or search hash value the stored images in the cluster will be returned. Thus, not only will the original image to which there is a match be returned but other stored input images that were received and grouped in the same cluster may be and sometimes are returned. While the match of a sub-image stored in a cluster will result in the return of the original stored image from which the sub-image was created the stored sub-image or sub-images may be and sometimes are not returned since they are creations from the original stored images and not actual input images which were stored, e.g., as part of an achieve process.

Once the matching stored images are identified the matching images are returned along with the other images in the cluster in which the matching images are stored. The images are displayed in step 1258, e.g., on a display device, to a user. When multiple images are retuned and displayed the user can select individual images by clicking on the displayed images, e.g., when multiple images are displayed as thumbnails or other small versions of the returned images. The user is provided in step 1260 with the ability to delete one or more of the returned images, modify the images, associate text or audio with the images and/or store the resulting modified image(s). The modifications and/or alternations may be and sometimes are applied only to the images the user selects.

In step 1262 user input is received and then in step 1264 the user requested operation is implemented, e.g., an image is deleted, modified or information such as audio or text is associated with the image prior to updating, e.g., restoring of the image and associated information in memory. Operation is shown proceeding from step 1264 back to step 1204 via connecting node 1266 C to indicate that the storage process is repeated using a user modified image in the case where a retrieved image is modified. In addition, it should be appreciated that a user can enter a new search to be processed at any time and/or initiate storage of a new image at any time. Thus, the method of FIG. 12 should be viewed as an ongoing process which is responsive to user input.

In various embodiments a searcher is provided as part of the search results all the images in a cluster of images including one or more images that match the search input. In this way the searcher will receive and be displayed stored image which have matching features or portions which match or are similar to an image being searched. Thus, using the method described herein a user can enter an image of a house or a portion of a house and receive in response to the input stored images of the house as well as images which were stored in the same image cluster as the matching image with the house. Similarly, a user can enter an image of a person and receive as matches other images of the same person even though the person forms only a small portion of the images which are being returned. Similarly, by inputting an image a user is able to search on related images which may be of the same building or scene area but correspond to different time periods for example with the images being returned because of some persistent feature that shows up in the multiple images over time.

The search and clustering methods are well suited for managing Ing, e.g., grouping, images for achieving and retrieval purposes and/or for supporting image based searching and retrieval of images included in an image achieve. They can also be used for automatic detection of duplicate images. In some embodiments images which have hash value which match very closely and are input for storage are automatically deleted rather than being stored.

In some embodiments the image achieve is a set of family photos and/or family images including images of family members and/or homes. As discussed above a user can input an image of a family member and receive in response to such search input other images including the particular family member and other family members. This allows for automatic retrieval of family images while the clustering techniques can facilitate automatic organization of images for storage, e.g., as sets of family images, without user grouping or association of images.

Numerous variations on the methods and apparatus are possible.

Numbered List of Exemplary Method Embodiments

Method Embodiment 1. An image processing method, the method comprising: processing (1106) a first image to create a first plurality of sub-images, each sub-image being an image corresponding to a different portion of the first image; generating (1125) a perceptual hash value for the first image and at least some of the images in the first plurality of sub-images; and grouping (1130) images into clusters based on the generated perceptual hash values, said grouping images including grouping at least some sub-images included in the first plurality of sub-images into different clusters, said different clusters including at least a first image cluster and a second image cluster.

Method Embodiment 1A. The method of Method Embodiment 1, further comprising: receiving (1104) the first image from a scanner or retrieving the first image from a set of stored images (e.g., a set of stored images including at least some scanned or captured images such as photographs and optionally some images which were generated by processing photographs).

Method Embodiment 2. The method of Method Embodiment 1, further comprising: storing (1134) the images corresponding to the first image cluster in a first storage location and storing (1136) the images corresponding to the second image cluster in a second storage location.

Method Embodiment 3. The method of Method Embodiment 1, further comprising: storing (1122) information associating sub-images generated from the first image with the first image.

Method Embodiment 4. The method of Method Embodiment 1, wherein processing (1106) the first image to create a first plurality of sub-images includes: dividing (1108) the first image into a plurality of discrete image portions, each discrete image portion being a different sub-image.

Method Embodiment 5. The method of Method Embodiment 4, wherein dividing (1108) the first image into a plurality of discrete image portions includes dividing (1110) the first image vertically into a first number of discrete vertical portions including at least a first vertical portion and a second vertical portion.

Method Embodiment 6. The method of Method Embodiment 5, wherein the method further includes: resizing (1116) the first vertical portion of the first image and the second vertical portion of the first image to generate first and second sub-images of a predetermined size.

Method Embodiment 7. The method of Method Embodiment 6, wherein dividing (1108) the first image into a plurality of discrete image portions further includes dividing (1112) the first image horizontally into a second number of discrete horizontal portions including at least a first horizontal portion and a second horizontal portion.

Method Embodiment 8. The method of Method Embodiment 7, wherein the method further includes: resizing (1118) the first horizontal portion and the second horizontal portion to generate third and fourth sub-images of the predetermined size.

Method Embodiment 9. The method of Method Embodiment 7, wherein dividing (1108) the first image into a plurality of discrete image portions further includes dividing (1114) the first image horizontally and vertical to form a plurality of block shaped image sub-portions.

Method Embodiment 9A. The method of Method Embodiment 9, wherein the method further includes: resizing (1120) the blocked shaped image sub-portions to generate corresponding sub-images of the predetermined size.

Method Embodiment 10. The method of Method Embodiment 1, wherein generating (1124) a perceptual hash value for the first image and at least some of the images in the first plurality of sub-images includes: generating (1126) a set of discrete cosine transform (DCT) coefficients for each of said first image and said at least some of the images in the first plurality of sub-images by performing DCT operations on each of the individual images to thereby generate a separate set of DCT values for each of the images; and performing (1128) a perceptual hash on the DCT values in each set of DCT values corresponding to an image to generate a corresponding hash value.

Method Embodiment 11. The method of Method Embodiment 10, further comprising: processing (1144) a second image to create a second plurality of sub-images, each sub-image in the second plurality of sub-images being an image corresponding to a different portion of the second image; generating (1164) a perceptual hash value for the second image and at least some of the images in the second plurality of sub-images; and grouping (1170) the second image and the sub-images generated from the second image into clusters based on the generated perceptual hash values, said grouping the second image and the sub-images generated from the second image into clusters including grouping at least some sub-images included in the second plurality of sub-images into different clusters, said different clusters including at least a third image cluster and a fourth image cluster.

Method Embodiment 12. The method of Method Embodiment 11, further comprising: storing (1174) the images corresponding to the third cluster in a third storage location and storing (1176) the images corresponding to the fourth image cluster in a fourth storage location.

Method Embodiment 13. The method of Method Embodiment 1, further comprising: storing (1162) information associating sub-images generated from the second image with the second image.

Method Embodiment 14. The method of Method Embodiment 11, wherein processing (1146) the second image to create a second plurality of sub-images includes: dividing (1148) the second image into a plurality of discrete image portions, each discrete image portion being a different sub-image.

Method Embodiment 15. The method of Method Embodiment 14, wherein dividing (1148) the second image into a plurality of discrete image portions includes dividing (1050) the second image vertically into a first number of discrete vertical portions including at least a first vertical portion of the second image and a second vertical portion of the second image.

Method Embodiment 16. The method of Method Embodiment 15, wherein the method further includes: resizing (1156) the first vertical portion of the second image and the second vertical portion of the second image to generate first and second sub-images of the second image of a predetermined size.

Method Embodiment 17. The method of Method Embodiment 16, wherein dividing (1148) the second image into a plurality of discrete image portions further includes dividing (1152) the second image horizontally into a second number of discrete horizontal portions of the second image including at least a first horizontal portion of the second image and a second horizontal portion of the second image.

Method Embodiment 18. The method of Method Embodiment 17, wherein the method further includes: resizing (1158) the first horizontal portion of the second image and the second horizontal portion of the second image to generate first and second sub-images of the second image of the predetermined size.

Method Embodiment 19. The method of Method Embodiment 17, wherein dividing (1148) the second image into a plurality of discrete image portions further includes dividing (1054) the second image horizontally and vertical to form a plurality of block shaped image sub-portions of the second image.

Method Embodiment 19A. The method of Method Embodiment 9, wherein the method further includes: resizing (1160) the blocked shaped image sub-portions of the second image to generate corresponding sub-images of the second image of the predetermined size.

Method Embodiment 20. The method of Method Embodiment 11, wherein generating (1164) a perceptual hash value for the second image and at least some of the images in the second plurality of sub-images of the second image includes: generating (1166) a set of discrete cosine transform (DCT) coefficients for each of said second image and said at least some of the images in the second plurality of sub-images of the second image by performing DCT operations on each of the individual images to thereby generate a separate set of DCT values for each of the second image and said at least some of the images in the second plurality of sub-images of the second image; and performing (1168) a perceptual hash on the DCT values in each set of DCT values corresponding to the second image and said plurality of sub-images of the second image to generate a separate hash value corresponding to each individual image.

Method Embodiment 21. The method of Method Embodiment 20, further comprising: grouping (1182) images into clusters including: computing (1184) a distance between said first and third image clusters based on differences between hash values corresponding to the images included in the first image cluster and hash values corresponding to images included in the third image cluster; and merging (1186) the first and third image clusters into a single image cluster in response to determining that the computed distances between the hash values corresponding to the first image cluster and the third image cluster are below a predetermined overall distance.

Method Embodiment 21AA. The method of Method Embodiment 21, wherein the first and third image clusters correspond to images generated from a single input image.

Method Embodiment 21AB. The method of Method Embodiment 21, wherein the first and third image clusters correspond to images generated from two different input images.

Method Embodiment 21A. The method of Method Embodiment 1, further comprising: receiving (1238) image search input including a search image; and identifying one or more stored images (1252) based on the search input.

Method Embodiment 21B. The method of Method Embodiment 21A, further comprising: generating (1246) a plurality of sub-images from the search image.

Method Embodiment 21C. The method of Method Embodiment 21B, wherein identifying one or more stored images (1252) based on the search input includes identifying stored images included in a stored image cluster which match the search image or a search sub-image generated from the search image.

Method Embodiment 21D. The method of Method Embodiment 21C, wherein identifying one or more stored images (1252) includes comparing (1254) hash values generated from said search image and from said search sub-images to hash values of images stored in said image clusters (e.g., compare the hash value of the search image to the individual hash value associated with each of the individual stored images and sub-images in the image clusters and optionally also compare the hash value of at least a first search sub-image to the to the individual hash value associated with each of the individual stored images and sub-images in the image clusters and declare a match between the compared images when they are within a predetermined amount of each other).

Method Embodiment 21E. The method of Method Embodiment 21D, further comprising: returning (1256) as search results one or more stored images from at least one image cluster which includes an image or sub-image determined to match the search image or a search sub-image generated from the search image.

Method Embodiment 21F. The method of Method Embodiment 21E, wherein original stored images in a cluster are returned as search results but not stored sub-images (e.g., original received images which were stored and grouped in clusters are returned but the sub-images generated from the stored received images are not returned in the search results in some embodiments).

Numbered List of Exemplary System Embodiments

System Embodiment 1. An image processing system, the system comprising: memory for storing images; and a processor configured to: process (1106) a first image to create a first plurality of sub-images, each sub-image being an image corresponding to a different portion of the first image; generate (1125) a perceptual hash value for the first image and at least some of the images in the first plurality of sub-images; and group (1130) images into clusters based on the generated perceptual hash values, said grouping images including grouping at least some sub-images included in the first plurality of sub-images into different clusters, said different clusters including at least a first image cluster and a second image cluster.

System Embodiment 2. The image processing system of System Embodiment 1, wherein the processor is further configured to control the image processing system to: receive (1238) image search input including a search image; and identify one or more stored images (1252) based on the search input.

System Embodiment 2B. The image processing system of System Embodiment 2, wherein the processor is further configured to control the image processing system to: generate (1246) a plurality of sub-images from the search image.

System Embodiment 2C. The image processing system of System Embodiment claim 2B, wherein the processor is further configured to control the image processing system to: identify one or more stored images (1252) based on the search input includes identify stored images included in a stored image cluster which match the search image or a search sub-image generated from the search image as part of identifying one or more stored images (1252) based on the search input System Embodiment 2D. The image processing system of System Embodiment 2C, wherein identifying one or more stored images (1252) includes comparing (1254) hash values generated from said search image and from said search sub-images to hash values of images stored in said image clusters (e.g. compare the hash value of the search image to the individual hash value associated with each of the individual stored images and sub-images in the image clusters and optionally also compare the hash value of at least a first search sub-image to the to the individual hash value associated with each of the individual stored images and sub-images in the image clusters and declare a match between the compared images when they are within a predetermined amount of each other).

System Embodiment 2E. The image processing system of System Embodiment 2D, wherein the processor is further configured to control the system to: return (1256) as search results one or more stored images from at least one image cluster which includes an image or sub-image determined to match the search image or a search sub-image generated from the search image.

System Embodiment 2F. The image processing system of System Embodiment 2E, wherein original stored images in a cluster are returned as search results but not stored sub-images (e.g., original received images which were stored and grouped in clusters are returned but the sub-images generated from the stored received images are not returned in the search results in some embodiments.

Numbered List of Non-Transitory Computer Readable Medium Embodiments

Non-Transitory Computer Readable Medium Embodiment 1. A non-transitory computer readable medium including processor executable instructions which when executed by the processor control a system including the processor and memory to: process (1106) a first image to create a first plurality of sub-images, each sub-image being an image corresponding to a different portion of the first image; generate (1125) a perceptual hash value for the first image and at least some of the images in the first plurality of sub-images; group (1130) images into clusters based on the generated perceptual hash values, said grouping images including grouping at least some sub-images included in the first plurality of sub-images into different clusters, said different clusters including at least a first image cluster and a second image cluster; and store the images corresponding to the first and second image clusters in a storage device with the generated hash values corresponding to the images in the first and second image clusters.

While document scanning is normally done in a home using a scanner included in or attached to a device in the home, the access control and ownership decisions can be made by the processor of the home device or by the processor of the secure server depending on the particular embodiment.

Thus, depending on the particular embodiment one or more of the steps shown in the flow charts can be implemented by the home management appliance 472 or another home device and/or by components in a server in accordance with the invention.

In view of the above, it should be appreciated that the appliance of the present invention offers numerous advantages over personal computer based systems and/or dedicated health care or photo scanning systems.

Various features are related to a multi-purpose appliance for providing a wide variety of functions, e.g., home management, device management and synchronization, archiving and distributing electronic copies of photos and/or film images and/or other services such as video conferencing is described. Methods and apparatus of the present invention relate to detecting duplicate images and/or similar image portions, grouping images and/or organizing images that are being stored, e.g., to facilitate and/or support image retrieval. In various embodiments one or more images are received. Received images are segmented into portions and perceptual hash values are generated for each of the image portions. Information relating to image portions and an original input image are stored along with the original input image and generated image portions. The hash values of multiple images are compared, e.g., using AI techniques, and similar images are automatically grouped together into one or more clusters. Clusters can be and sometimes are arranged into a hierarchy along with information indicating the hash values corresponding to the stored images. Images are identified for retrieval purposes using their hash values and/or the hash values of one or more images in a cluster in which an image is stored. An image or image portion can be and sometimes is supplied to retrieve similar or related images.

The methods of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are also directed to machine, e.g., computer, readable medium, e.g., ROM, RAM, CDs, hard discs, etc., which include machine readable instructions for controlling a machine, e.g., processor or computer system, to implement one or more steps of a method.

It is understood that the specific order or hierarchy of steps in the processes disclosed is an example of exemplary approaches. Based upon design preferences, it is understood that the specific order or hierarchy of steps in the processes may be rearranged to some extent while remaining within the scope of the present disclosure.

In various embodiments nodes described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a non-transitory machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine, e.g., computer, readable medium including machine, e.g., computer, executable instructions for causing a machine, e.g., computer, processor and/or associated hardware, to perform one or more of the steps of the above-described method(s).

Some embodiments are directed to a computer program product comprising a computer-readable medium comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of the method or methods described herein. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of the invention.

What is claimed is:

1. An image processing method, the method comprising:
processing a first image to create a first plurality of sub-images, each sub-image being an image corresponding to a different portion of the first image;
generating a perceptual hash value for the first image and at least some of the images in the first plurality of sub-images; and
grouping images into clusters based on the generated perceptual hash values, each individual one of said first image and the first plurality of sub-images being grouped into a corresponding one of the clusters, said grouping images including grouping said first image and a first set of sub-images corresponding to different portions of said first image into a first image cluster and at least some other sub-images corresponding to said first image included in the first plurality of sub-images into a second image cluster.

2. The method of claim 1, further comprising:
storing the images corresponding to the first image cluster in a first storage location and storing the images corresponding to the second image cluster in a second storage location.

3. The method of claim 2, further comprising:
receiving image search input including a search image; and
identifying an image cluster that includes an image that matches said search image; and
returning the images in the identified image cluster.

4. The method of claim 3, wherein the returned images of the identified cluster include all images in the identified image cluster, said returned images including a sub-image.

5. The method of claim 1,
wherein processing the first image to create a first plurality of sub-images includes:
dividing the first image into a plurality of discrete image portions, each discrete image portion being a different sub-image; and
wherein dividing the first image into a plurality of discrete image portions includes dividing the first image vertically into a first number of discrete vertical portions including at least a first vertical portion and a second vertical portion.

6. The method of claim 5, wherein the method further includes:

resizing the first vertical portion of the first image and the second vertical portion of the first image to generate first and second sub-images of a predetermined size.

7. The method of claim 6, wherein dividing the first image into a plurality of discrete image portions further includes dividing the first image horizontally into a second number of discrete horizontal portions including at least a first horizontal portion and a second horizontal portion.

8. The method of claim 3, wherein said first and second image clusters include different numbers of images and wherein the second image cluster does not include the first image.

9. The method of claim 3, wherein the search image is an image of a building including a feature that persists over time and wherein the images that are returned are images from a stored cluster of images including a stored image found to match the search image because of the persistent building feature.

10. The method of claim 1, wherein generating the perceptual hash value for the first image and at least some of the images in the first plurality of sub-images includes:
    generating a set of discrete cosine transform (DCT) coefficients for each of said first image and said at least some of the images in the first plurality of sub-images by performing DCT operations on each of the individual images to thereby generate a separate set of DCT values for each of the images; and
    performing a perceptual hash on the DCT values in each set of DCT values corresponding to an image to generate a corresponding hash value.

11. The method of claim 10, further comprising:
    processing a second image to create a second plurality of sub-images, each sub-image in the second plurality of sub-images being an image corresponding to a different portion of the second image;
    generating a perceptual hash value for the second image and at least some of the images in the second plurality of sub-images; and
    grouping the second image and the sub-images generated from the second image into clusters based on the generated perceptual hash values, said grouping the second image and the sub-images generated from the second image into clusters including grouping at least some sub-images included in the second plurality of sub-images into different clusters, said different clusters including at least a third image cluster and a fourth image cluster.

12. The method of claim 11, wherein generating the perceptual hash value for the second image and at least some of the images in the second plurality of sub-images of the second image includes:
    generating a set of discrete cosine transform (DCT) coefficients for each of said second image and said at least some of the images in the second plurality of sub-images of the second image by performing DCT operations on each of the individual images to thereby generate a separate set of DCT values for each of the second image and said at least some of the images in the second plurality of sub-images of the second image; and
    performing a perceptual hash on the DCT values in each set of DCT values corresponding to the second image and said plurality of sub-images of the second image to generate a separate hash value corresponding to each individual image.

13. The method of claim 12, further comprising:
    grouping images into clusters including:
    computing a distance between said first and third image clusters based on differences between hash values corresponding to the images included in the first image cluster and hash values corresponding to images included in the third image cluster; and
    merging the first and third image clusters into a single image cluster in response to determining that the computed distances between the hash values corresponding to the first image cluster and the third image cluster are below a predetermined overall distance.

14. The method of claim 1, further comprising:
    receiving image search input including a search image; and
    identifying one or more stored images matching the search input; and
    returning images in a stored cluster of images found to include a stored image matching the search input.

15. The method of claim 14, further comprising:
    generating a plurality of sub-images from the search image; and
    wherein identifying one or more stored images matching the search input includes identifying stored images included in a stored image cluster which match the search image or a search sub-image generated from the search image.

16. The method of claim 15, wherein identifying one or more stored images includes comparing hash values generated from said search image and from said search sub-images to hash values of images stored in said image clusters.

17. The method of claim 16, further comprising:
    returning as search results one or more stored images from at least one image cluster which includes an image or sub-image determined to match the search image or a search sub-image generated from the search image.

18. The method of claim 17, wherein original stored images in a cluster are returned as search results but not stored sub-images.

19. An image processing system, the system comprising:
    memory for storing images; and
    a processor configured to:
        process a first image to create a first plurality of sub-images, each sub-image being an image corresponding to a different portion of the first image;
        generate a perceptual hash value for the first image and at least some of the images in the first plurality of sub-images; and
        group images into clusters based on the generated perceptual hash values, each individual one of said first image and the first plurality of sub-images being grouped into a corresponding one of the clusters, said grouping images including grouping said first image and a first set of sub-images corresponding to different portions of said first image into a first cluster and at least some other sub-images corresponding to said first image included in the first plurality of sub-images into a second image cluster.

20. A non-transitory computer readable medium including processor executable instructions which when executed by the processor control a system including the processor and memory to:
    process a first image to create a first plurality of sub-images, each sub-image being an image corresponding to a different portion of the first image;

generate a perceptual hash value for the first image and at least some of the images in the first plurality of sub-images;

group images into clusters based on the generated perceptual hash values, each individual one of said first image and the first plurality of sub-images being grouped into a corresponding one of the clusters, said grouping images including grouping said first image and a first set of sub-images corresponding to different portions of said first image into a first image cluster and at least some other sub-images corresponding to said first image included in the first plurality of sub-images into a second image cluster; and store the images corresponding to the first and second image clusters in a storage device with the generated hash values corresponding to the images in the first and second image clusters.

\* \* \* \* \*